(12) United States Patent
Hoshii

(10) Patent No.: US 7,898,592 B2
(45) Date of Patent: Mar. 1, 2011

(54) IMAGE PROCESSING APPARATUS, IMAGE PROCESSING METHOD, AND IMAGE PROCESSING SYSTEM

(75) Inventor: Jun Hoshii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 388 days.

(21) Appl. No.: 12/203,792

(22) Filed: Sep. 3, 2008

(65) Prior Publication Data
US 2009/0059030 A1 Mar. 5, 2009

(30) Foreign Application Priority Data
Sep. 5, 2007 (JP) .............................. 2007-230660

(51) Int. Cl.
*H04N 5/232* (2006.01)
(52) U.S. Cl. ...................... 348/349; 396/123
(58) Field of Classification Search .............. 348/222.1, 348/345–346, 349, 239; 396/121–123
See application file for complete search history.

(56) References Cited

U.S. PATENT DOCUMENTS

| 7,702,231 | B2* | 4/2010 | Sugimoto | 396/123 |
| 2007/0296848 | A1* | 12/2007 | Terashima | 348/345 |
| 2010/0033593 | A1* | 2/2010 | Sasaki | 348/222.1 |
| 2010/0220208 | A1* | 9/2010 | Park et al. | 348/222.1 |

FOREIGN PATENT DOCUMENTS

| JP | 2002-344989 | 11/2002 |
| JP | 2004-264893 | 9/2004 |
| JP | 2004-318204 | 11/2004 |
| JP | 2007-139535 | 6/2007 |

\* cited by examiner

*Primary Examiner*—Tuan Ho
(74) *Attorney, Agent, or Firm*—DLA Piper LLP (US)

(57) ABSTRACT

An image processing apparatus includes a face detecting unit that detects a face included in image data generated by a photographing operation, a face transforming and correcting unit that performs a face correcting process for shrinking a width of a detected face in a case where the face is detected by the face detecting unit, and a shading processing unit that performs a process for increasing sharpness of an in-focus area of the image data and performs a shading process for an out-of-focus area of the image data, in a case where a face has not been detected by the face detecting unit.

6 Claims, 30 Drawing Sheets

$$\begin{cases} Sd : Ww = f : Wx & \cdots(1) \\ Ww : Wf = Wwi : Wfi & \cdots(2) \end{cases}$$

$$\Downarrow$$

$$Sd = (Wwi \times Wf \times f) / (Wfi \times Wx) \cdots(3)$$

$$W1 = 2\sqrt{r^2 - \frac{r^4}{d^2}}$$

$$W2 = \frac{-4r^2 L + 4\sqrt{4 d^4 r^2 + d^2 r^2 L^2 - 4 r^4 d^2}}{L^2 + 4 d^2}$$

Sd:SHORT

⇩

DEGREE OF SHADING:LOW

Sd:LONG

⇩

DEGREE OF SHADING:HIGH

FIG. 22A
FIG. 22B
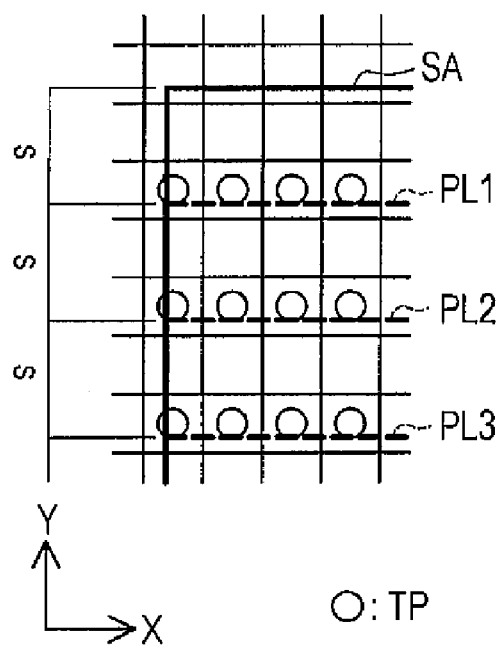
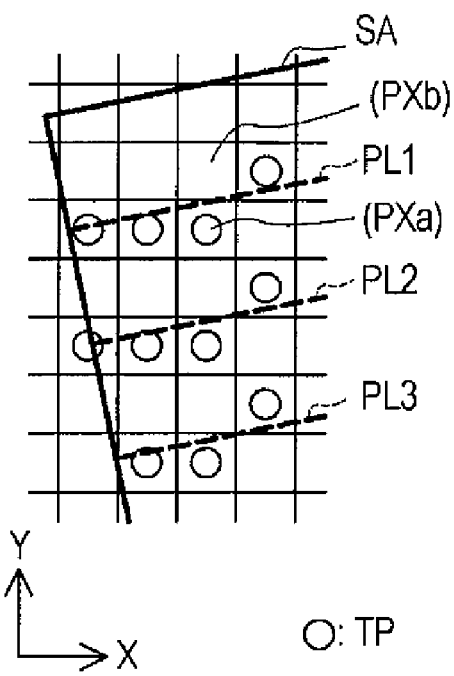
FIG. 23
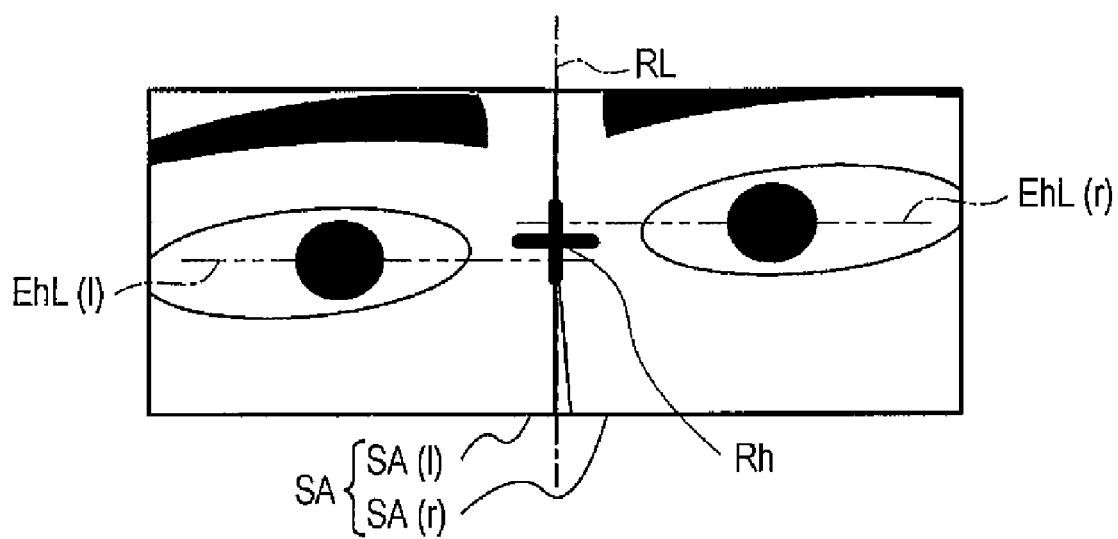

|  | H | V |
|---|---|---|
| D11 | DQp | 2*DQp |
| D21 | DQp | 2*DQp |
| D31 | -DQp | 2*DQp |
| D41 | -DQp | 2*DQp |
| D12 | DQp | 0 |
| D22 | 0 | 0 |
| D32 | 0 | 0 |
| D42 | -DQp | 0 |

IMAGE PROCESSING APPARATUS, IMAGE PROCESSING METHOD, AND IMAGE PROCESSING SYSTEM

CROSS-REFERENCE TO RELATED APPLICATIONS

This application claims the benefit of priority under 35 USC 119 of Japanese patent application no. 2007-230660, filed on Sep. 5, 2007, which is hereby incorporated by reference.

BACKGROUND

1. Technical Field

The present invention relates to an image processing apparatus, method and system in which an image process is performed for acquired image data, and more particularly, to an image processing apparatus, method and system in which techniques for an image process are switched for each subject.

2. Related Art

Generally, digital cameras that electronically store subjects such as landscapes have been known. The digital camera can electrically store an image of a subject, which is formed through a lens, in a memory. In addition, stored image data can be simply modified in the digital camera and the output device side (for example, see JP-A-2002-344989).

In the above-described digital cameras, a depth of focus is set to be high so a user can easily focus a subject. The depth of focus means a range in which a sharp image can be acquired on the front and rear sides of a focal plane in a case where a subject is focused. Since the depth of focus is high, the sharpness of the photographed object is high regardless of a position relationship of a photographing target included in the subject. Accordingly, the image output from the digital camera is different from an image formed through the eyes. Thus, a user generally performs a manual image process to form the image data to be close to the image formed through the eyes.

SUMMARY

An advantage of some aspects of the invention is that it provides an image processing apparatus, method and system that automatically performs an image process for acquired image data to be close to an image formed through the eyes.

According to an aspect of the invention, a face detecting unit detects a face in image data generated by an image pickup operation. When a face is detected from the image data, a face transforming and correcting unit performs a face correcting process for shrinking a width of an area corresponding to the face of the image data. On the other hand, when a face is not detected by the face detecting unit, a shading processing unit performs a process for increasing sharpness of an in-focus area of the image data and performs a shading process for an out-of-focus area of the image data.

A person's image that is formed through a lens is visually recognized to expand in the horizontal direction, compared to a person's image that is formed through the eyes. Accordingly, when a person's face is included in the image data, a face correcting process is performed to make the image data close in the width direction to the image formed though the eyes. In addition, a person's eyes change a view of a target object in accordance with an observed target. Thus, when a face is not included in the image data, the sharpness of an in-focus area is increased and a shading process is performed for an out-of-focus area of the image data.

As a result, the image data on which the above-described image process has been performed becomes close to an image formed by looking at the subject with eyes.

BRIEF DESCRIPTION OF THE DRAWINGS

The invention is described with reference to the accompanying drawings, wherein like numbers reference like elements.

FIGS. 22A and 22B are diagrams showing an example of a method of selecting evaluation target pixels TP according to an embodiment of the invention.

FIG. 23 is a diagram showing an example of a method of determining a height reference point Rh according to an embodiment of the invention.

DESCRIPTION OF EXEMPLARY EMBODIMENTS

Figure 1:
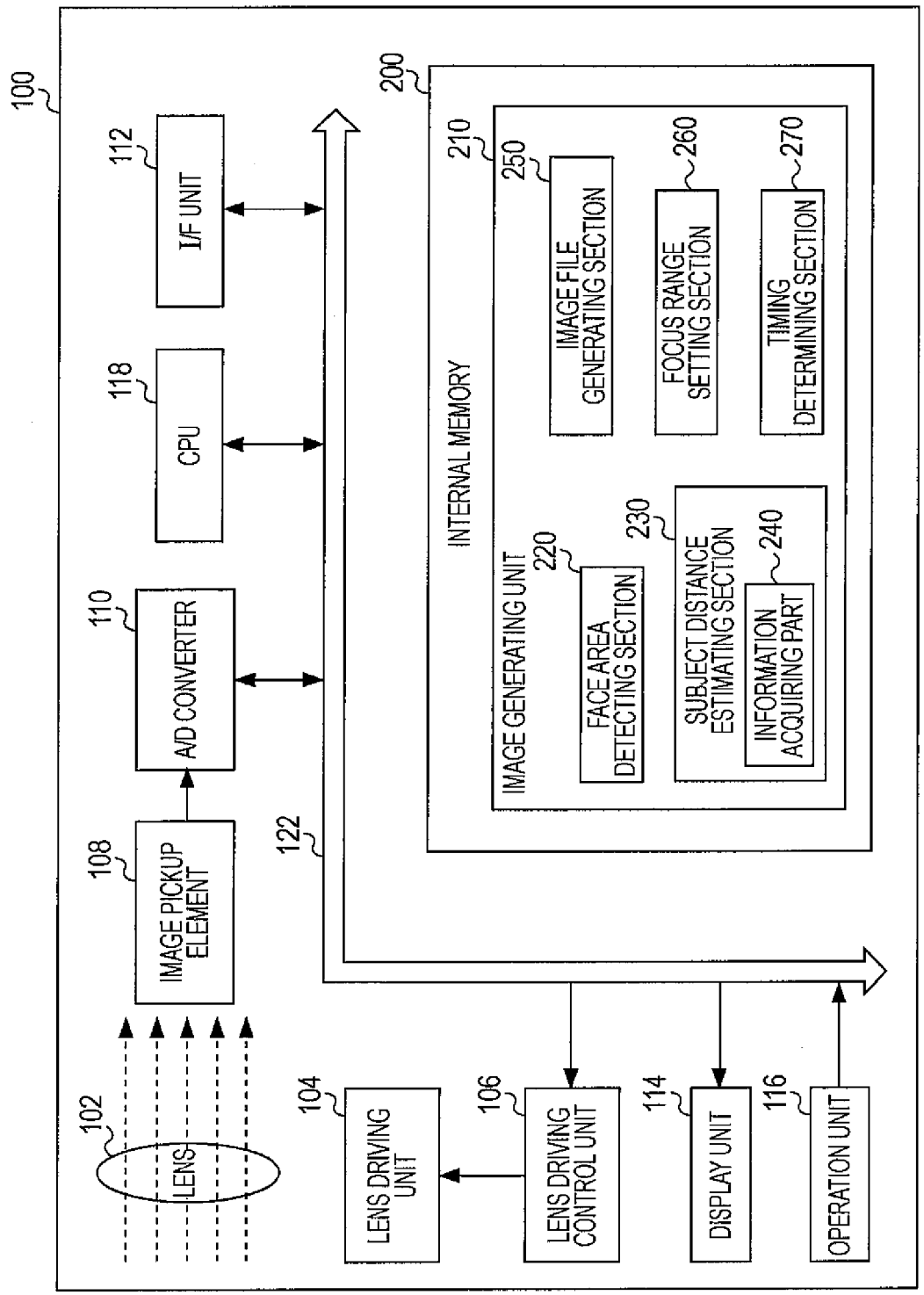
FIG. 1 is a schematic diagram of a digital still camera (DSC) as an image processing apparatus according to a first embodiment of the invention.
Figure 6:
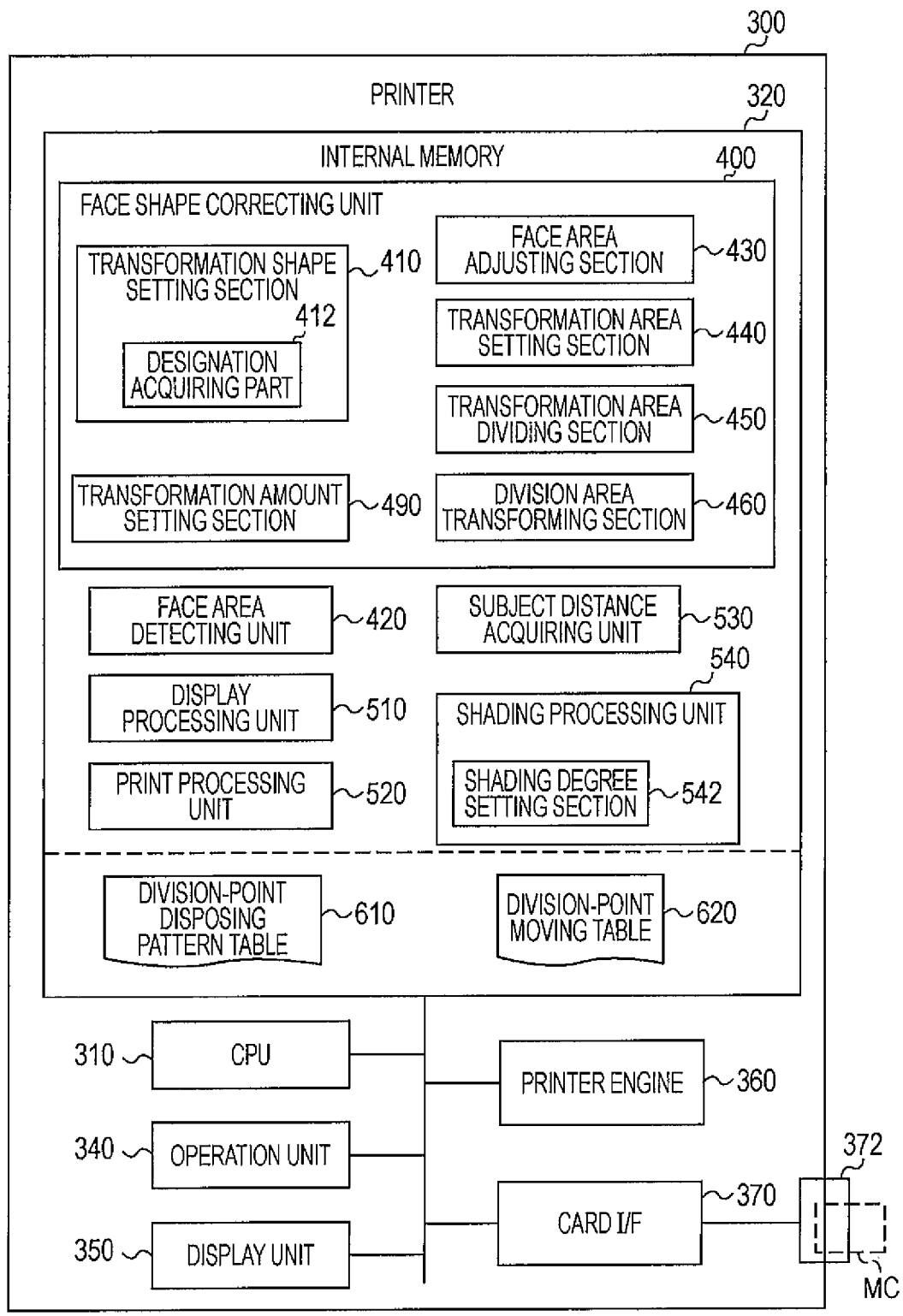
FIG. 6 is a diagram of a printer as an image processing apparatus according to the first embodiment.

Embodiments of the present invention are now described in the following order based on examples.
A. First Embodiment
A-1. Configuration of Image Processing Apparatus
A-2. Face Shape Correcting and Printing Process
A-3. Setting Transformation Area
A-4: Transformation Process
B. Second Embodiment A. First Embodiment A-1. Configuration of Image Processing Apparatus FIG. 1 is a schematic diagram of a digital still camera (DSC) 100 that constitutes an image processing apparatus according to a first embodiment of the invention. FIG. 6 is a diagram of a printer 300 that constitutes the image processing apparatus according to the first embodiment of the invention. The DSC 100 photographs a subject to generate an image and stores a distance to the subject as distance information. The printer 300 performs an image process by changing an image processing technique and the intensity of the image process in accordance with the generated image and the distance information. In the image process performed by the printer 300 an image formed through a lens is processed to be close to an image formed through naked eyes.

Here, the subject is a target to be copied and photographed and mainly represents an object that exists in an area (in-focus area) to be clearly copied and photographed.

The DSC 100 serves as a photographing (image acquiring) apparatus that photographs an object to generate an image and also serves as an image processing apparatus that performs an image process for the generated image. The DSC 100 includes a lens 102, a lens driving unit 104 that adjusts the focal position and the focal distance by driving the lens 102, a lens driving control unit 106 that controls the lens driving unit 104, an image pickup element 108 that converts light input to a light acceptance surface through the lens 102 into an electrical signal, an A/D converter 110 that performs A/D conversion for the electrical signal output from the image pickup element 108, an interface unit (I/F unit) 112 that is used to exchange information with external devices, a display unit 114 that is configured by a liquid crystal display, an operation unit 116 that is configured by buttons or a touch panel, a CPU 118 that controls units of the DSC 100, and an internal memory 200 that is configured by a ROM and a RAM. The image pickup element 108 is, for example, configured by a CCD. The constituent elements of the DSC 100 are interconnected through a bus 122.

In the internal memory 200, an image generating unit 210 is stored. The image generating unit 210 includes, as program modules, a face area detecting section 220, a subject distance estimating section 230, an image file generating section 250, a focus range setting section 260, and a timing determining section 270. The subject distance estimating section 230 includes an information acquiring part 240. The CPU 118 implements the function of the image generating unit 210 by reading out and executing programs from the internal memory 200. Functions of these sections are described later in the description for an image generating process.

Figure 2:
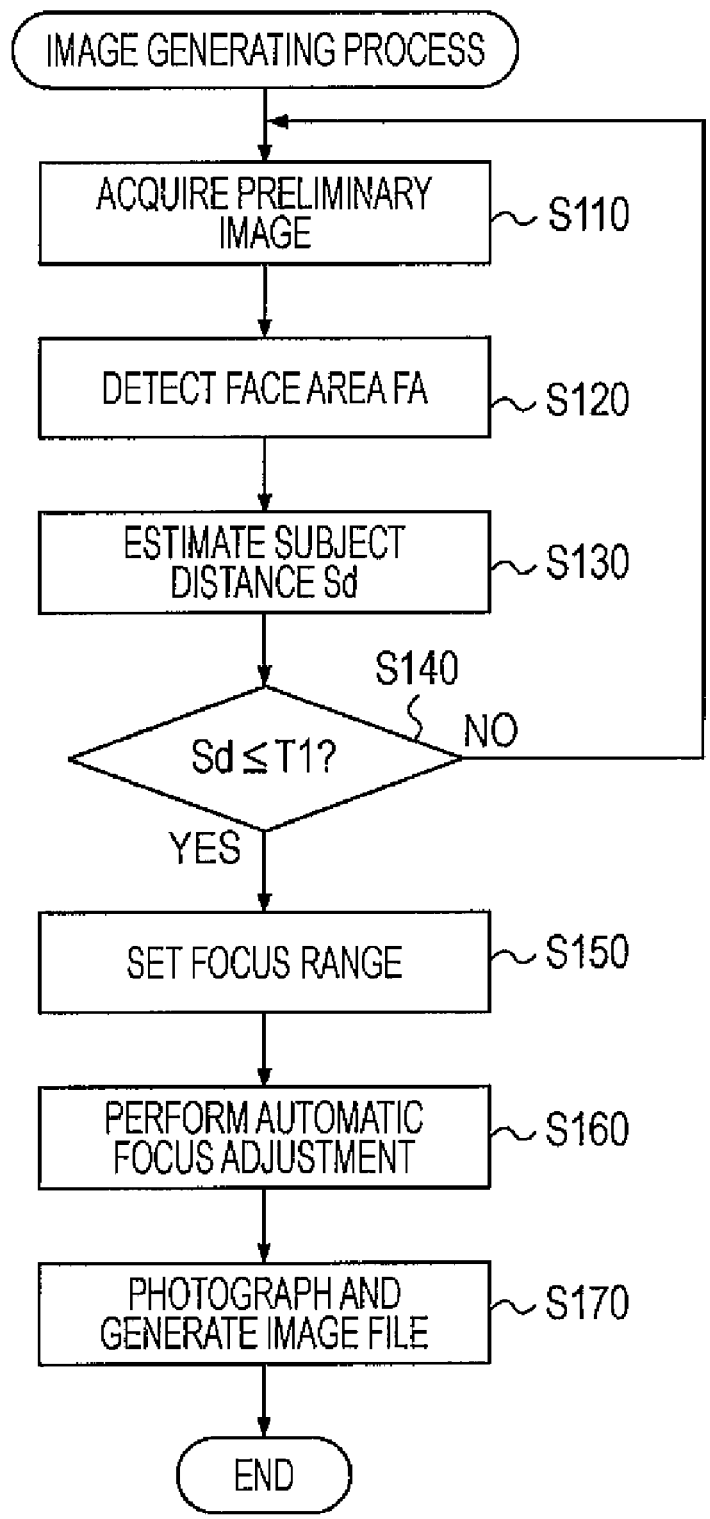
FIG. 2 is a flowchart of an image generating process performed by the DSC of the first embodiment.

FIG. 2 is a flowchart of an image generating process performed by the DSC 100 according to the first embodiment. In the image generating process, a photographing operation is performed in a case where a predetermined condition is satisfied, and an image file including image data that represents an image is generated.

In step S110, the image generating unit 210 acquires a preliminary image. The preliminary image is a candidate for a photographic image that a user can check using a finder of the image pickup device or the like. The preliminary image becomes the photographic image when a user presses down a shutter. The image generating unit 210 acquires the preliminary image by controlling the lens 102, the image pickup element 108 and the A/D converter 110. When the display unit 114 is used as a finder in the photographing operation, the preliminary image is displayed in the display unit 114.

In step S120, the face area detecting section 220 detects a face area FA in the preliminary image. The face area FA represents an area in which at least an image of a part of a face is included as an image area of a target image TI. An operation for detecting a face area FA using the face area detecting section 220 is performed, for example, by using a known face detecting method such as a pattern matching method (see JP-A-2004-318204) using a template. The face area detecting section 220 detects an image of a face as a subject and may be referred to as a face detecting section.

Figure 3A:
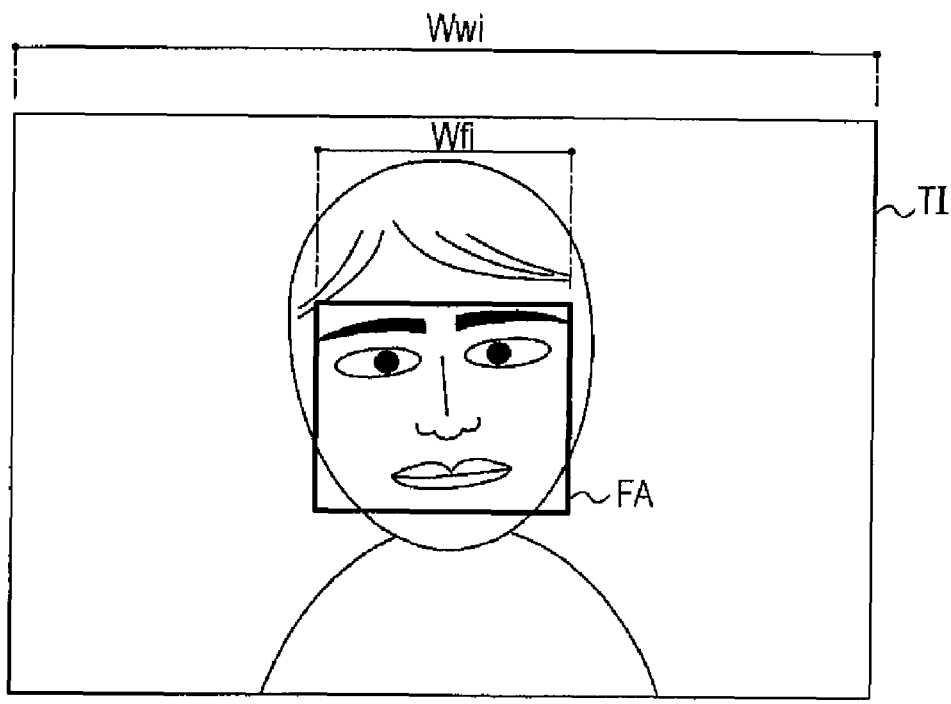
FIGS. 3A and 3B are diagrams showing an example of a result of detection for a face area FA according to an embodiment of the invention.
Figure 3B:
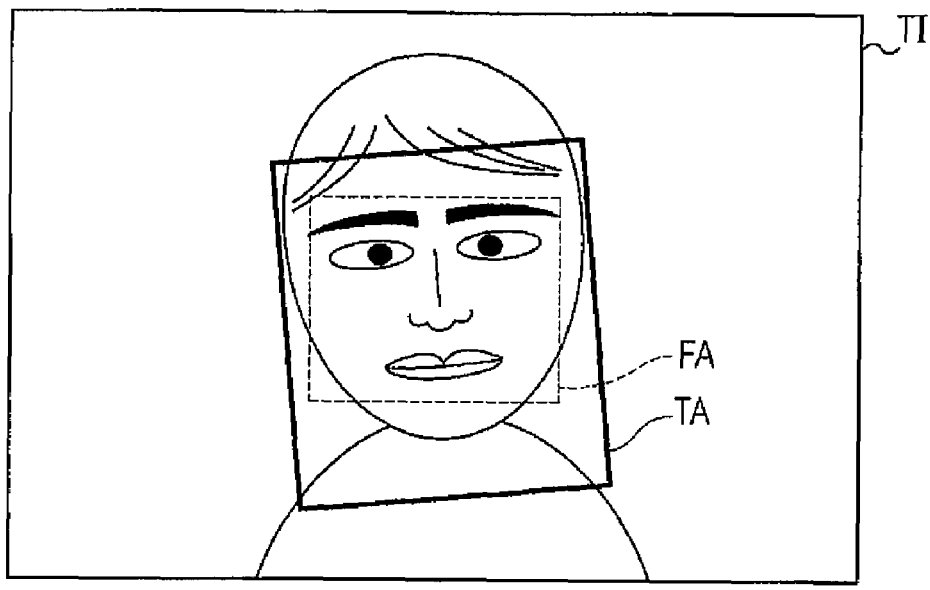

FIGS. 3A and 3B are diagrams showing an example of a result of detection for a face area FA. In FIGS. 3A and 3B, an image of a person's face is included in the target image TI. Accordingly, in step S120, the face area FA is detected from the target image TI. The face area FA is formed as a rectangular area including images of two eyes and a mouth. The face area detecting section 220 outputs information (for example, coordinates of four vertexes of the face area FA) that can determine the position of the face area FA in the target image TI as a result of detection of the face area FA. As shown in FIG. 3A, the width of the target image TI is represented by Wwi (the unit is the number of pixels), and the width of the face area FA is represented by Wfi (the unit is the number of pixels).

In step S130, the subject distance estimating section 230 estimates a subject distance Sd in the preliminary image. In a method of estimating the subject distance Sd, the information acquiring part 240 acquires information of the width of the entire preliminary image, the width of the face area FA, the width of a face of a person P, the focal distance of the lens, and the width of the imaging surface, and the subject distance estimating section 230 calculates (estimates) the subject distance Sd using the above-described information and Numeric Equation 3 set forth below.

The subject distance Sd estimated by the subject distance estimating section 230 represents a distance from a photographic device (more particularly, a principal point of a lens of the photographic device) to a subject of a specific type in photographing the target image TI. In this embodiment, a person's face is set as a subject of the specific type. Thus, the subject distance Sd is a distance from the photographic device to a person's face.

Figure 4:
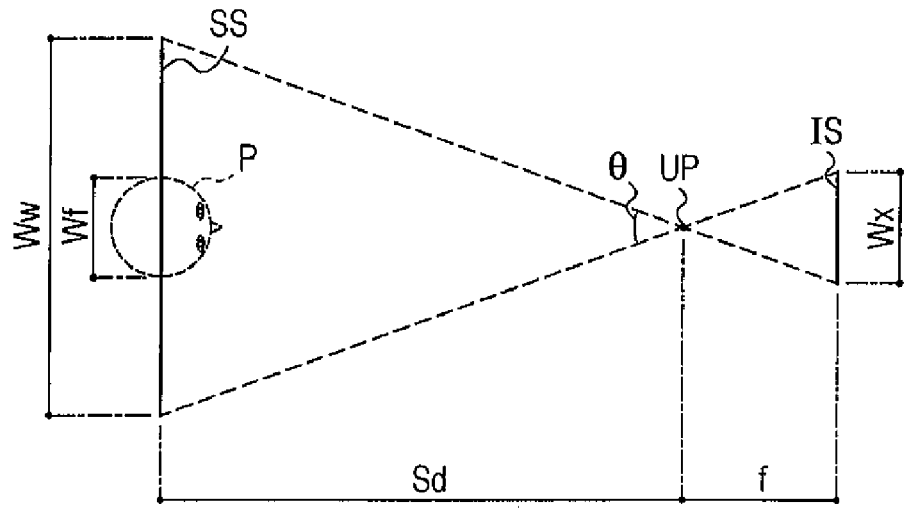
FIG. 4 is a diagram showing a method of estimating a subject distance Sd according to an embodiment of the invention.

FIG. 4 is a diagram showing a method of estimating the subject distance Sd. In FIG. 4, a position relationship between an imaging surface IS of the photographic device and a face of a person P as a subject in photographing the target image TI is shown. The subject distance Sd that is a distance between a principal point UP of the lens and the face of the person P is determined by a width Ww of an image pickup range and an angle of field θ in a surface (subject surface SS) that includes the position of the face of the person P and is parallel to the imaging surface IS. The angle of field θ is determined based on the relationship between a focal distance f of the lens and a width Wx of the imaging surface IS. In other words, Numeric Equation 1 shown below is satisfied.

$$Sd:Ww=f:Wx \qquad \text{Numeric Equation 1}$$

The width Ww of the image pickup range on the subject surface SS is determined based on the size of an image of the face of the person P occupied in the target image TI (FIG. 3). In other words, a ratio of the width of the face of the person P to the width Ww on the subject surface SS is considered to be the same as a ratio of the width Wfi of the face area FA to the width Wwi of the entire image in the target image TI.

$$Ww:Wf=Wwi:Wfi \qquad \text{Numeric Equation 2}$$

Numeric Equation 3 follows from Numeric Equations 1 and 2:

$$Sd=(Wwi \times Wf \times f)/(Wfi \times Wx) \qquad \text{Numeric Equation 3}$$

The information acquiring part 240 (FIG. 1) of the subject distance estimating section 230 acquires information needed for calculating the subject distance Sd using Numeric Equation 3. In particular, the information acquiring part 240 acquires the value (number of pixels) of the width Wwi of the entire target image TI that is added as metadata to the image file representing the target image TI and calculates the value (number of pixels) of the width Wfi of the face area FA (FIG. 3). The calculation of the width Wfi of the face area FA is performed, for example, by calculating a distance between two vertexes by using coordinates of the two vertexes of the face area FA.

The information acquiring part 240 acquires an approximate value (for example, 200 mm) of a width of a typical person's face (actual size of a face) that is set in advance and is stored in the internal memory 320 (FIG. 1) as the value of the width Wf of the face of the person P. The value of the width Wf of the face of the person P corresponds to second information according to an embodiment of the invention.

The information acquiring part 240 acquires the value of the focal distance f of the lens at the photographing process that is included in supplementary data of the image file for the target image TI. Here, the acquired value of the focal distance f of the lens is a value of 35 mm film equivalent and may be different from the actual focal distance of the image pickup device. In such a case, the information acquiring part 240 acquires the value (=36 mm) of the width of the 35 mm film that is set in advance as the width Wx of the imaging surface IS. When data of the actual focal distance and data of the width of the image pickup element of the image pickup device are included in the supplementary data of the image file, the information acquiring part 240 may be configured to acquire the value of the actual focal distance as the focal distance f of the lens and acquire the value of the width of the image pickup element as the width Wx of the imaging surface IS. In addition, when data representing the angle of field is included in the supplementary data of the image file, the information acquiring part 240 may be configured to acquire the data representing the angle of field.

The subject distance estimating section 230 calculates (estimates) the subject distance Sd using the above-described information (the values of the width Wwi of the entire target image TI, the width Wfi of the face area FA, the width Wf of the face of the person P, the focal distance f of the lens and the width Wx of the imaging surface IS) acquired by the information acquiring part 240 and Numeric Equation 3.

Figure 5:
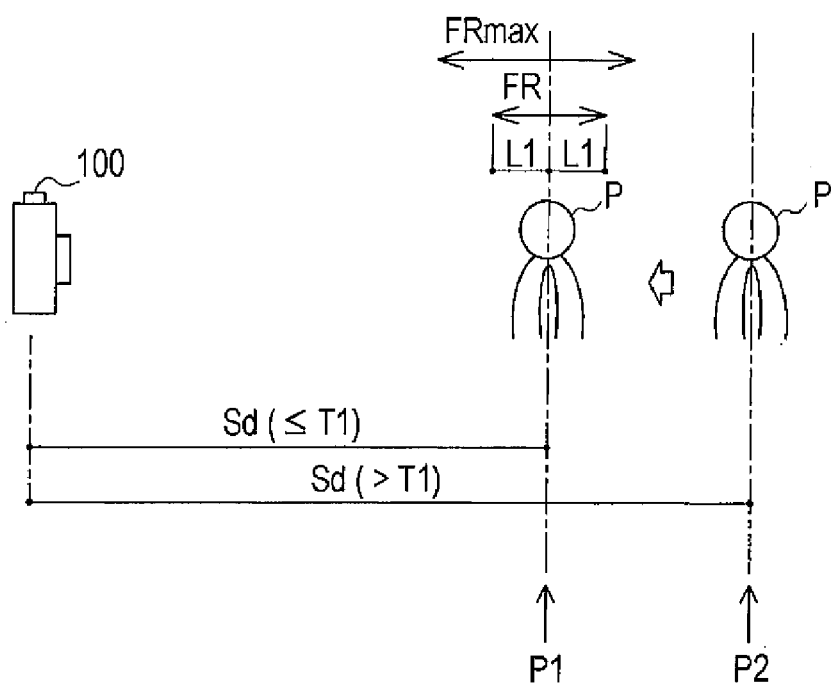
FIG. 5 is a diagram showing an overview of an image generating process according to the first embodiment.

In step S140 (FIG. 2), the timing determining section 270 (FIG. 1) determines the timing for generating an image (timing for photographing) based on the subject distance Sd estimated in Step S130. FIG. 5 is an overview of an image generating process according to the first embodiment. In the image generating process, a condition that the subject distance Sd is equal to or shorter than a predetermined threshold value T1 is set as a condition for generating (photographing) an image. In other words, when a person P as a subject is in position P2 shown in FIG. 5, the above-described condition for a photographing operation is not satisfied, and a photographing operation is not performed. On the other hand, when the person moves to position P1, the above-described condition is satisfied, and thus a photographing operation is performed. The condition for the photographing operation may be set, for example, for a security camera.

In step S140, the timing determining section 270 compares the subject distance Sd with the threshold value T1. When the subject distance Sd is equal to or less than the threshold value T1, the timing determining section 270 determines to perform image generation, and the process proceeds to step S150. When the subject distance Sd is greater than the threshold value T1, the timing determining section 270 determines not to perform image generation, and the process returns to step S110. Steps S110-S140 are repeated at predetermined regular time intervals until generation of an image is determined in step S140.

In step S150 (FIG. 2), the focus range setting section 260 (FIG. 1) sets a focus range FR based on the subject distance Sd estimated in step S130. The focus range FR is a range in which the focus is to be positioned in a photographing operation. The focus range setting section 260, as shown in FIG. 5, sets a range having widths of a predetermined distance L1 on the front and rear sides from a position spaced from the DSC 100 by the subject distance Sd as the focus range FR. The focus range FR is set to be narrower than a maximum focus range FRmax in which the focus can be positioned based on the mechanism of the DSC 100.

In step S160 (FIG. 2), the image generating unit 210 (FIG. 1) performs automatic focus adjustment (auto focus) by controlling the lens 102, the lens driving unit 104 and the lens driving control unit 106. In particular, the image generating unit 210 acquires images by picking up the images with the focus moved in the focus range FR and adjusts the focus to a position corresponding to an image of the acquired images that has the highest sharpness (contrast). In an automatic focus adjusting operation for a general DSC, contrasts of images acquired by moving the focus within the maximum focus range FRmax are detected. On the other hand, in an automatic focus adjusting operation for the DSC 100 according to this embodiment, contrasts of images acquired by moving the focus only within the focus range FR that is narrower than the maximum focus range FRmax are detected, and accordingly, the time required for focus adjustment is decreased.

In step S170 (FIG. 2), the image generating unit 210 (FIG. 1) generates image data by performing a photographing operation, and the image file generating section 250 generates an image file that includes data representing the subject distance Sd estimated in Step S130. The image file is generated, for example, in conformity with Exif standards, and the data representing the subject distance Sd is added to the image file as supplementary data and stored in the memory card MC. The image file is generated in conformity with the Exif (Exchangeable Image File Format) standards by a photographic device such as a digital still camera, and includes supplementary data including diaphragm opening, shutter speed, a focal distance of the lens, and the like in the image pickup operation, in addition to the image data generated by the image pickup operation.

As described above, in the image generating process using the DSC 100 according to the first embodiment, the subject distance Sd in the preliminary image is estimated, and an image generating (photographing) timing is determined based on the estimated subject distance Sd. Accordingly, an image can be generated by setting a photographic condition relating to a distance between the DSC 100 and the subject.

The printer 300 according to the first embodiment is a color ink jet printer that prints an image based on image data acquired from a memory card MC or the like, which is a so called direct printing operation. When an area corresponding to a person's face is included in the image data stored in the memory card MC, the printer 300 performs a face shape correcting operation for the face area. When a face area is not included, such as in a landscape image, the printer 300 performs a shading process in accordance with the subject distance.

The printer 300 includes a CPU 118 that controls units of the printer 300, an internal memory 320 that is, for example, configured by a ROM and a RAM, an operation unit 340 that is configured by buttons or a touch panel, a display unit 350 that is configured by a liquid crystal display, a printer engine 360, and a card interface (I/F) 370. The constituent elements of the printer 300 are interconnected through a bus. In addition, the printer 300 may include an interface for data communication with a digital still camera or a personal computer.

The printer engine 360 is a printing mechanism that performs a printing operation based on the print data. The card interface 370 is used for data exchange with the memory card MC that is inserted into a card slot 372. In this embodiment, an image file that includes image data as RGB data is stored in the memory card MC. The printer 300 acquires the image file stored in the memory card MC through the card interface 370.

A face shape correcting unit 400, a face area detecting unit 420, a subject distance acquiring unit 530, a display processing unit 510, a shading processing unit 540, and a print processing unit 520 are stored in the internal memory 320. The face shape correcting unit 400 and the face area detecting unit 420 are computer programs that perform face shape correcting and face area detecting processes under a predetermined operating system. The display processing unit 510 is a display driver that displays a process menu or a message in the display unit 350. The shade processing unit 540 is a computer program that changes a shading process that is performed for a background area other than a face area in accordance with the subject distance. The print processing unit 520 is a computer program for generating print data based on the image data, controlling the printer engine 360, and performing a print process for an image based on the print data. The CPU 118 implements functions of the above-described units by reading and executing the programs from the internal memory 320.

The face shape correcting unit 400 includes, as program modules, a transformed shape setting section 410, a face area adjusting section 430, a transformation area setting section 440, a transformation area dividing section 450, a division area transforming section 460, and a transformation amount setting section 490. The transformed shape setting section 410 includes a designation acquiring part 412. The functions of these sections are described later in a face shape corrected printing process. An image is transformed by the transformation area dividing section 450 and the division area transforming section 460. Thus, the transformation area dividing section 450 and the division area transforming section 460 may be referred to as a face transforming and correcting section.

The face area detecting section 420 of the printer 300 has the same function as that of the face area detecting section 220 of the digital still camera 100.

A division point disposing pattern table 610 and a division point moving table 620 are stored in the internal memory 320. The contents of the division point disposing pattern table 610 and the division point moving table 620 are described later in the description of the face shape corrected printing process.

Figure 7:
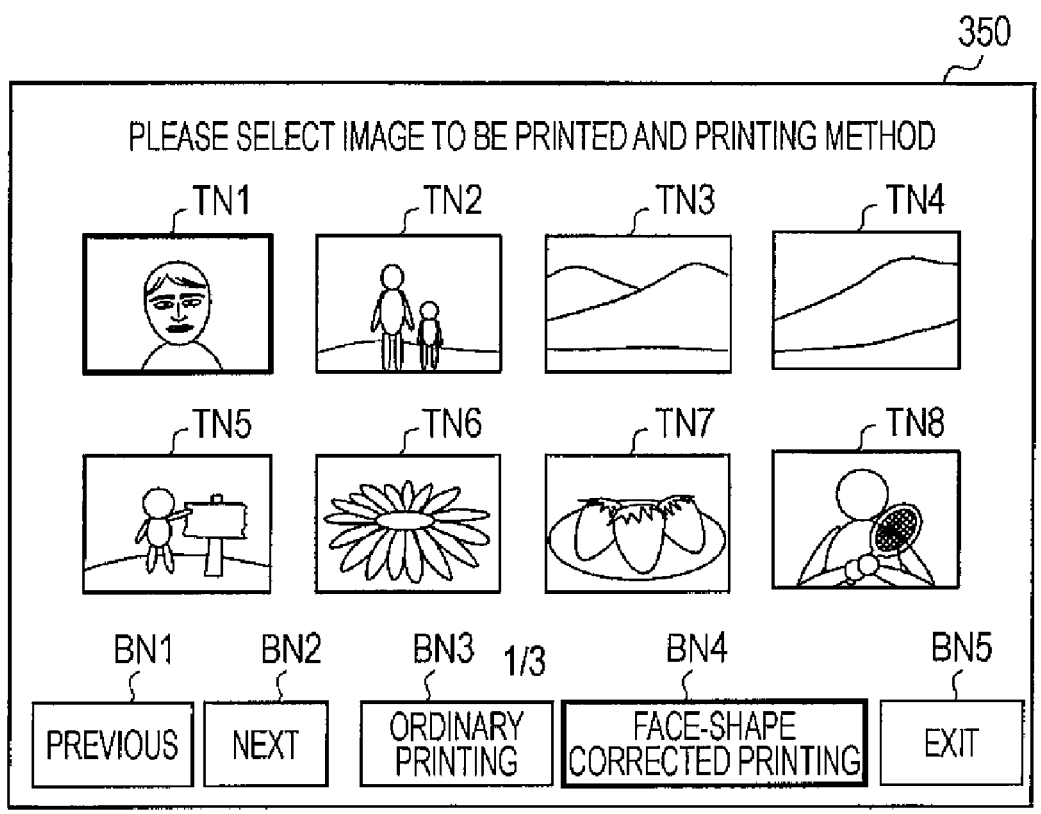
FIG. 7 is a diagram showing an example of a user interface including a display of a list of images according to an embodiment of the invention.

A-2: Corrected Printing Process According to Embodiment of Present Invention The printer 300 prints an image based on the image file stored in the memory card MC. When the memory card MC is inserted into the card slot 372, a user interface including a display of the list of images stored in the memory card MC is displayed in the display unit 350 by the display processing unit 510. FIG. 7 is an example of a user interface including a display of the list of images. In FIG. 7, eight thumbnail images TN1-TN8 and five buttons BN1-BN5 are displayed. In this embodiment, the display of the list of images is performed using the thumbnail images included in the image file that is stored in the memory card MC.

In the user interface of FIG. 7, when a user selects one image, or a plurality of images, and selects an ordinary print button BN3, the printer 300 performs an ordinary print process in which a selected image is printed in an ordinary manner. On the other hand, when the user selects one image, or a plurality of images, and selects a corrected print button BN4, the printer 300 performs a face shape corrected print process in which the shape of a face included in the selected image is corrected and an image after correction is printed. In FIG. 7, since the thumbnail image TN1 and the face correcting print button BN4 are selected, the printer 300 performs the face shape correcting print process for an image corresponding to the thumbnail image TN1.

Figure 8:
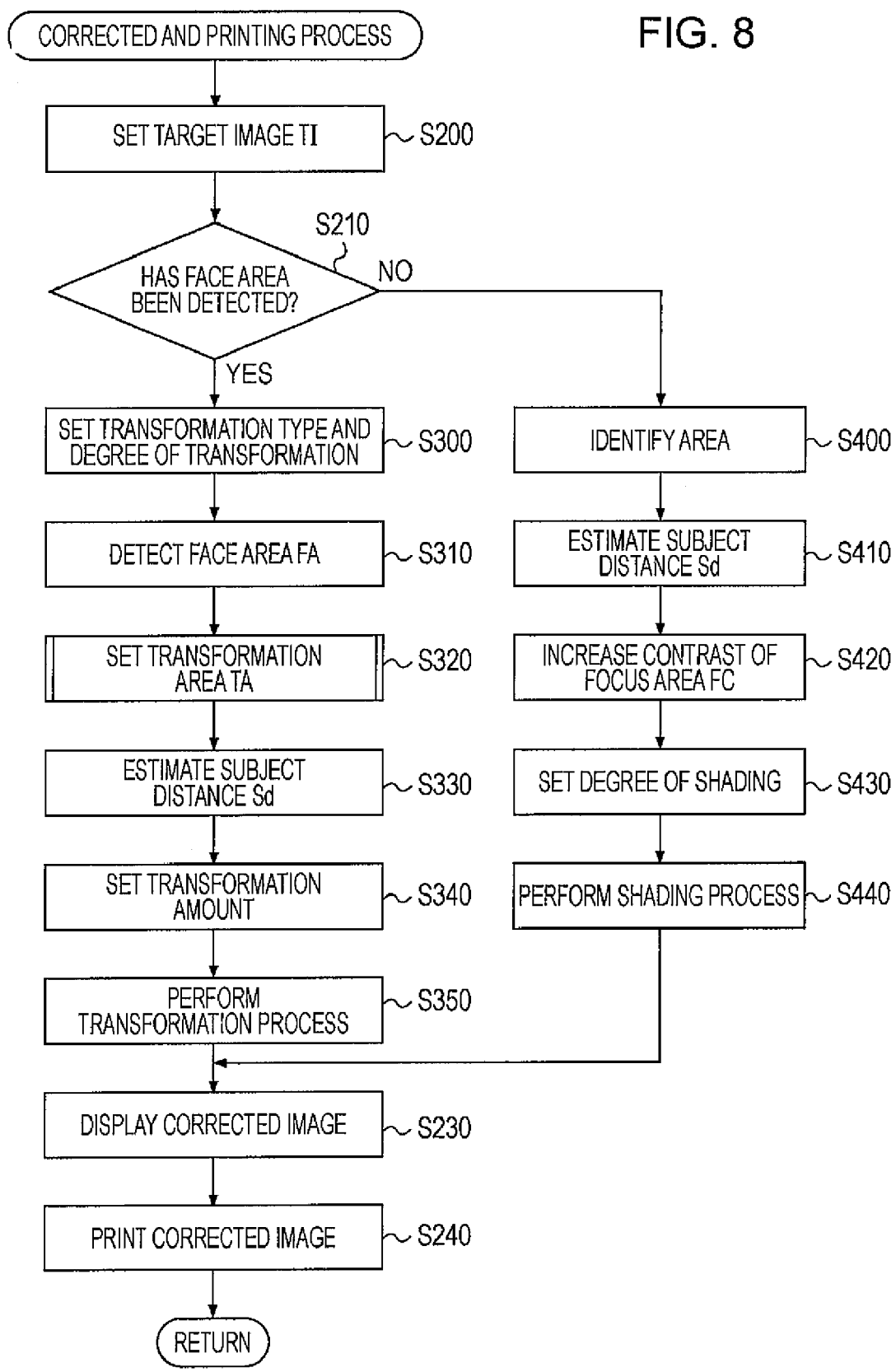
FIG. 8 is a flowchart of a face shape corrected printing process performed by the printer according to the first embodiment.

FIG. 8 is a flowchart of a corrected print process performed by the printer 300 according to the first embodiment. In steps S200-S210, whether a face area FA exists in the image data is determined. When the face area FA is included in the image data, the face shape correcting unit 400 (FIG. 1) performs a face shape correcting process (steps S300-S350). When a face area FA is not included, the shading processing unit 540 performs a shading process for the image data (steps S400-S440). The face shape correcting process corrects at least the shape (for example, the contour shape of a face or the shape of eyes) of a part of a face included in the image. The same method as that of detecting the face area FA in the DSC 100 is used to detecting the face area FA. Alternatively, a method in which the DSC 100 adds detection of a face as supplementary data to the image file and the face area is detected by using the supplementary data may be used.

In step S200, the face shape correcting unit 400 (FIG. 1) sets a target image TI that becomes a target for the face shape correcting process. The face shape correcting unit 400 sets an image corresponding to the thumbnail image TN1 selected by the user from the user interface of FIG. 7 as the target image TI. The image file of the set target image TI is acquired by the printer 300 from the memory card MC through the card I/F 370 and is stored in a predetermined area of the internal memory 320. Hereinafter, the image data included in the image file that is acquired from the memory card MC and stored in the internal memory 320 of the printer 300 is also referred to as original image data, and an image represented by the original image data is also referred to as an original image.

In step S210, the transformed shape setting section 410 (FIG. 1) sets the type of image transformation and the degree of image transformation for the face shape correcting process. The transformed shape setting section 410 directs the display processing unit 510 to display a user interface used for setting the type and degree of image transformation in the display unit 350, selects the type and degree of image transformation designated by the user through the user interface, and sets the selected type and degree of image transformation as the type and degree of image transformation used for the process.

Figure 9:
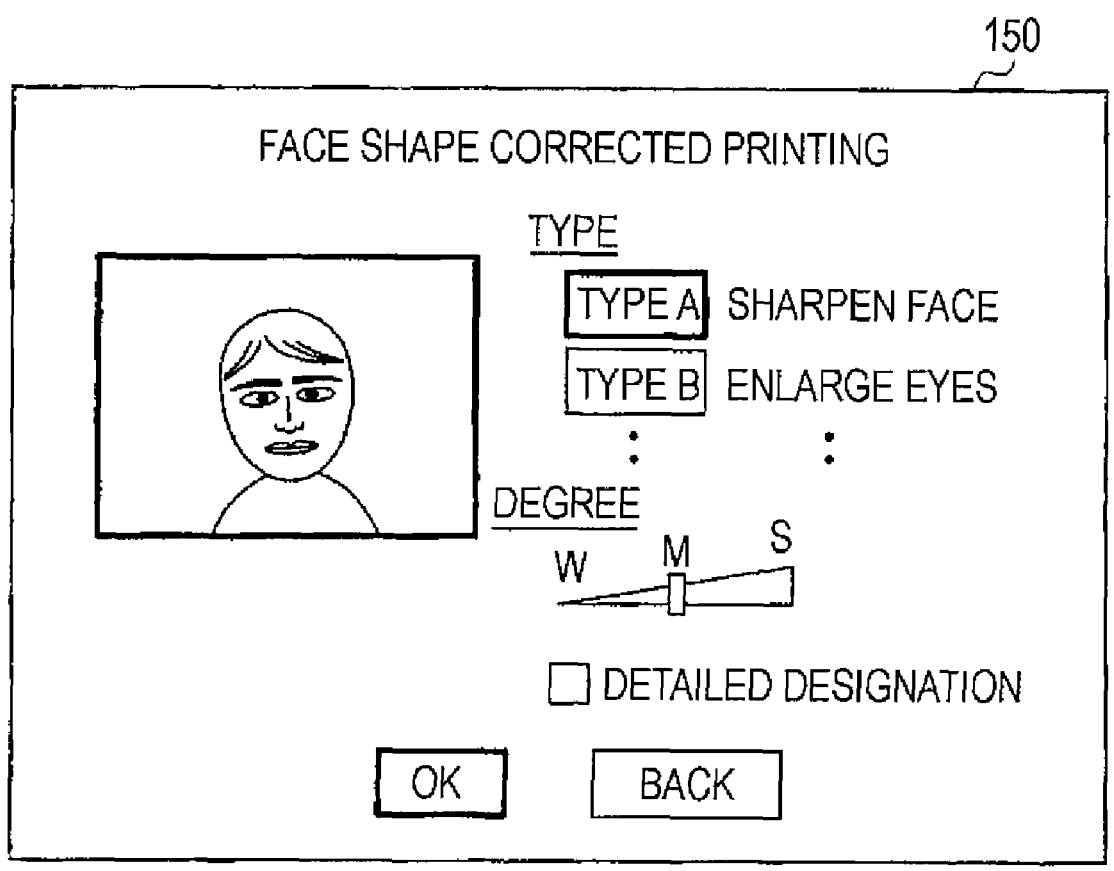
FIG. 9 is a diagram showing an example of a user interface used for setting the type and degree of image transformation according to an embodiment of the invention.

FIG. 9 is an example of a user interface used for setting the type and degree of image transformation. As shown in FIG. 9, the user interface includes an interface for setting the type of image transformation. In this embodiment, it is assumed that type A that is a transformation type for sharpening the face shape and type B that is a transformation type for enlarging the shape of eyes are set in advance as options. The user designates the type of image transformation through this interface. The transformed shape setting section 410 sets the type of image transformation designated by the user as the type of image transformation to be used for an actual process.

The user interface of FIG. 9 includes an interface used for setting the degree of image transformation. As shown in FIG. 9, in this embodiment, four levels including "strong" S, "medium" M, "weak" W and "automatic" are set in advance as options as the degrees of image transformation. The user designates the degree of image transformation through this interface. When one of "strong", "medium", and "weak" is designated, the transformed shape setting section 410 sets the designated degree of image transformation as the degree of image transformation to be used for an actual process. When "automatic" is designated, the degree of image transformation (transformation amount) is automatically set by the transformation amount setting section 490 (FIG. 1). A check box included in the user interface is checked for a case where the user wants detailed designation of the transformed shape.

In the following description, it is assumed that transformation type A for sharpening the face shape is set as the type of image transformation, "automatic" is selected as the degree of image transformation (step S300), and detailed designation is not requested from the user.

In step S320 (FIG. 8), the printer 300 sets a transformation area TA based on the detected face area FA. The transformation area TA is an area of the target image TI that becomes a target for an image transformation process for face shape correction. A method of setting the transformation area TA is described in detail in "A-3. Setting Transformation Area". FIG. 3B shows the result of setting the transformation area TA in Step s320. A broken line in FIG. 3B represents the face area FA detected in step S320, and a solid line represents the set transformation area TA.

In step S330 (FIG. 8), the subject distance acquiring unit 530 (FIG. 6) acquires the subject distance Sd from the supplementary information by referring to the memory card MC. In step S340, the transformation amount setting section 490 (FIG. 1) sets the transformation amount (also referred to as the degree of transformation or the level of transformation). A method of setting the transformation amount by using the transformation setting section 490 is described in detail in "A-4. Transformation Process".

In step S350 (FIG. 8), a transformation process is performed for the transformation area TA set in step S320. The transformation process is described in detail in "A-4. Transformation Process".

Figure 10A:
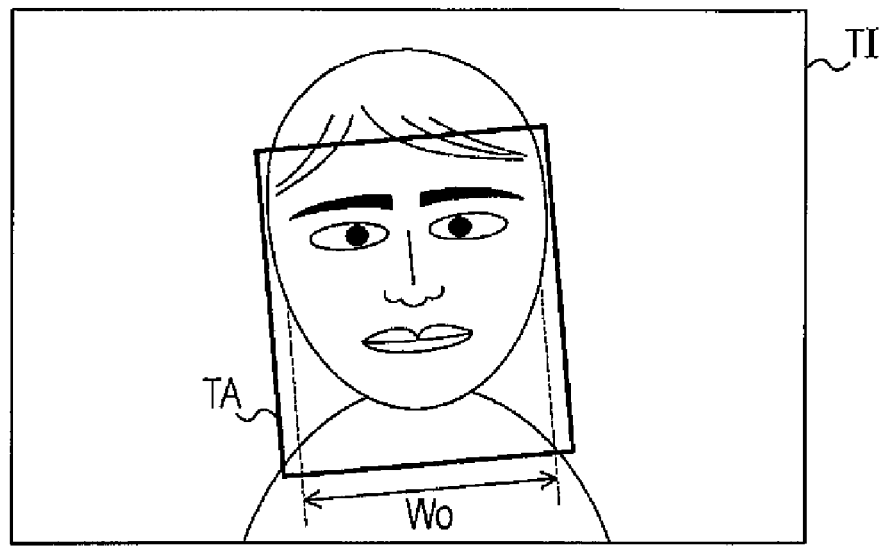
FIGS. 10A and 10B are diagrams showing the result of a transformation process according to an embodiment of the invention.
Figure 10B:
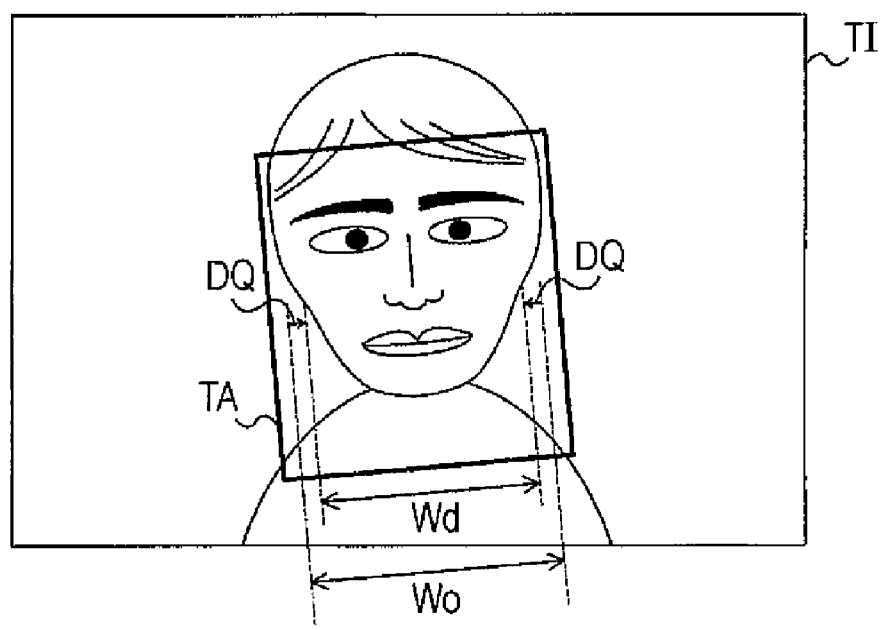

FIGS. 10A and 10B show the result of the transformation process. FIG. 10A shows the target image TI before the transformation process of step S350, and FIG. 10B shows the target image TI after the transformation process. As shown in FIG. 10B, in the target image TI after the transformation process, the image of a person's face within the transformation area TA is formed to be thin. In addition, the transformation process in step S600 is performed only for the image within the transformation area TA of the target image TI, and thus the image outside the transformation area TA is not transformed. As a result, the subject is transformed without excessively transforming the entire image.

In FIGS. 10A and 10B, the image of lines (the contour of the face) of left and right cheeks of the face is moved inward by the transformation amount DQ. The transformation amount DQ is the amount set in step S340. By performing the transformation process, the width Wd of the face image after the transformation process becomes smaller than the width Wo of the face image before the transformation process by two times the transformation amount DQ. In this embodiment, the direction of the width of the face image is set to a direction perpendicular to the rectangular face area FA, which is detected by using the pattern matching method, in the longitudinal direction. However, the width direction is not limited thereto, and any other direction may be used.

The reason for transforming the image to have a decreased width is to make an impression for the subject acquired by observing the image close to an impression acquired by observing the real subject.

Figure 11:
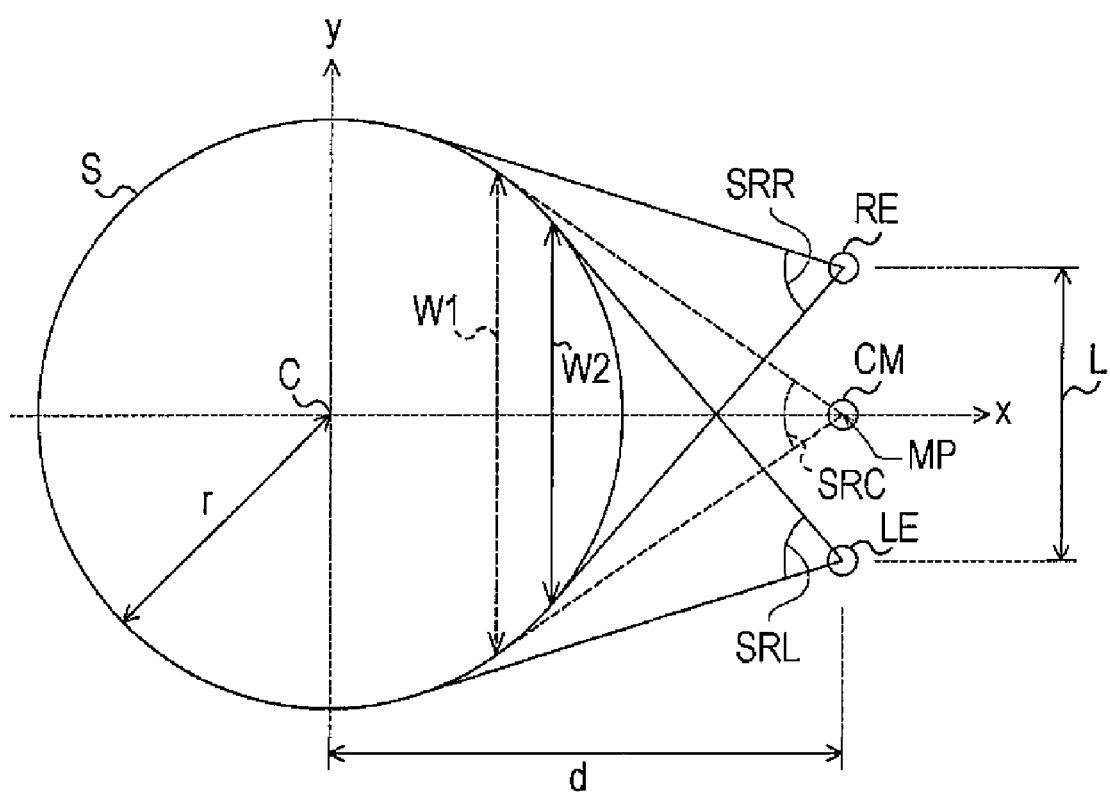
FIG. 11 is a diagram showing a difference of impressions for a subject.

FIG. 11 is a diagram showing a difference of impressions for the subject. A subject S, a right eye RE of a person (observer), a left eye LE of the person and a camera CM as a photographic device are shown in FIG. 11. A position relationship viewed from the upper side of the observer is shown in FIG. 11.

In FIG. 11, for simplification of description, the shape of the subject S viewed from the upper side is assumed to be a circle having a radius of r. The circular subject S is not limited to a person's head, and may be other subjects (for example, a cylindrical building or a ball). Subject S is located on the right front side of eyes RE and LE. The camera CM is disposed in a middle point MP of the eyes RE and LE. Thus, the camera CM views the subject S from approximately the same position as that of the observer. Coordinate axis x shown in FIG. 11 passes through the center C of the subject S and the middle point MP. Coordinate axis y passes through the center C and is perpendicular to the axis x. The eyes RE and LE are aligned along the axis y. Distance L denotes a distance between the eyes RE and LE. Distance d denotes a distance between the center C and the eyes RE and LE along the axis x.

First width W1 of FIG. 11 denotes the width of the subject S. The first width W1 represents the width of a portion that is visible from the camera CM. The portion that is visible from the camera CM is a portion of the surface of the subject S that is located within the subject range SRC of the camera. The subject range SRC of the camera represents a range, which is occupied by the subject S, of the entire range of the field of view of the camera CM.

Second width W2 of FIG. 11 denotes the width of the subject S. The second width W2 represents the width of a portion that is visible from the eyes RE and LE. The portion that is visible from the eyes RE and LE is in a range in which a right subject range SRR and a left subject range SRL are overlapped with each other of the surface of the subject S. The right subject range SRR represents a range, which is occupied by the subject S, of the entire range of the field of view of the right eye RE. The left subject range SRL represents a range, which is occupied by the subject S, of the entire range of the field of view of the left eye LE.

As shown in FIG. 11, visible portions of the subject S for the right eye RE and the left eye LE are different. The portion that is visible from the right eye RE is inclined toward the right eye RE side, and the portion that is visible from the left eye LE is inclined toward the left eye LE side. In such a case, it is estimated that a person's (observer's) recognition for the subject S is strongly influenced by a visible portion common to the eyes RE and LE. For example, it is estimated that a person recognizes the width W2 of the visible portion that is common to the eyes RE and LE as the width of the subject S.

In addition, as shown in FIG. 11, the second width W2 is smaller than the first width W1. When an image generated by the image pickup operation is observed, an impression that the width of the subject is greater than that for a case where the real subject S is observed is acquired. Accordingly, by transforming the image to have a decreased width as shown in FIG. 10B, the impression of the subject acquired from observation of the image is close to an impression acquired from observing the real subject.

Figure 12:
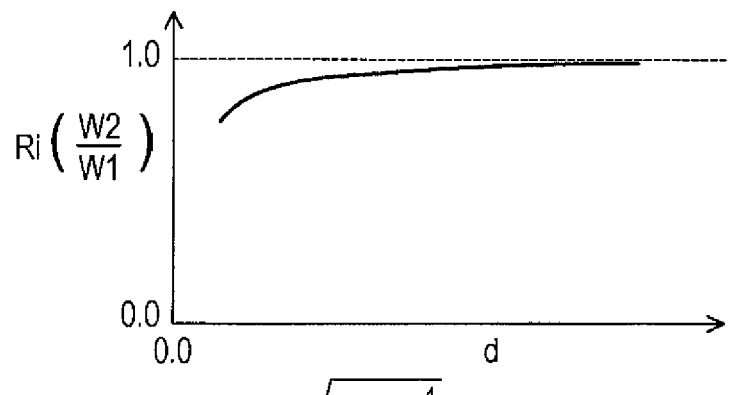
FIG. 12 is a graph showing a relationship between a ratio Ri of a second width W2 to a first width W1 and a distance d according to an embodiment of the invention.

FIG. 12 is a graph showing a relationship between a ratio Ri of the second width W2 to the first width W1 and a distance d. The horizontal axis represents the distance d, and the vertical axis represents the ratio Ri. In FIG. 12, the widths W1 and W2 are represented as functions of a radius r, distance d and a distance L. The radius r and the distance L are fixed.

As shown in FIG. 12, the ratio Ri (W2/W1) decreases as the distance d decreases. The ratio Ri (W2/W1) is smaller than 1.0, and comes close to 1.0 as the distance d increases.

Figure 13A:
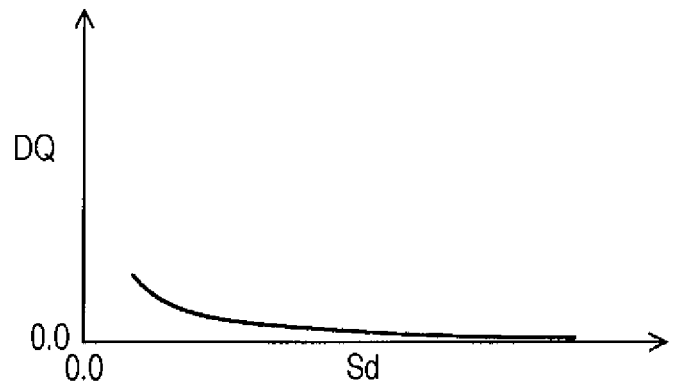
FIG. 13A is a graph showing a relationship between a transformation amount DQ and a subject distance Sd.
Figure 13B:
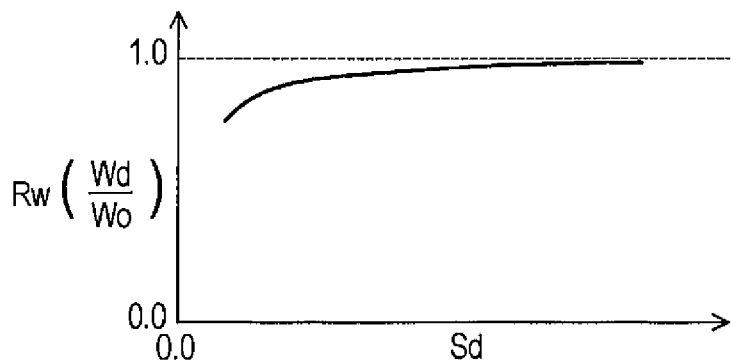
FIG. 13B is a graph showing a relationship between a ratio Rw and the subject distance Sd, according to an embodiment of the invention.

FIG. 13A is a graph showing a relationship between the transformation amount DQ and the subject distance Sd. FIG. 13B is a graph showing a relationship between a ratio Rw of the width Wd after transformation to the width Wo before transformation and the subject distance Sd. In theses graphs, the horizontal axis denotes the subject distance Sd estimated in step S570 (FIG. 8).

The transformation amount DQ shown in FIG. 13A is set in advance such that the ratio Rw shown in FIG. 13B is identical to the ratio Ri shown in FIG. 12. As a result, as the subject distance Sd is decreased, the transformation amount DQ is set to a larger value. The distance L and the radius r are fixed to predetermined values in advance. The distance L between the eyes may be set, for example, as 100 mm. A representative value (for example, 100 mm) for the subject may be used as the radius r (the size of the subject S). In this embodiment, the transformation amount DQ represents a change rate (in this case, a rate of decrease) of the width within the transformation area TA.

In step S340 of FIG. 8, the transformation amount setting section 490 (FIG. 1) determines the transformation amount DQ from the subject distance Sd acquired in step S330 by using the correspondence relationship shown in FIG. 13A that has been set in advance. In step S350, the image is transformed by using the transformation amount DQ determined as described above (FIG. 10B). As a result, the image is appropriately transformed in accordance with the subject distance Sd, and an impression of the subject that is acquired from observation of the image is close to an impression acquired from observation of the real subject.

Figure 14:
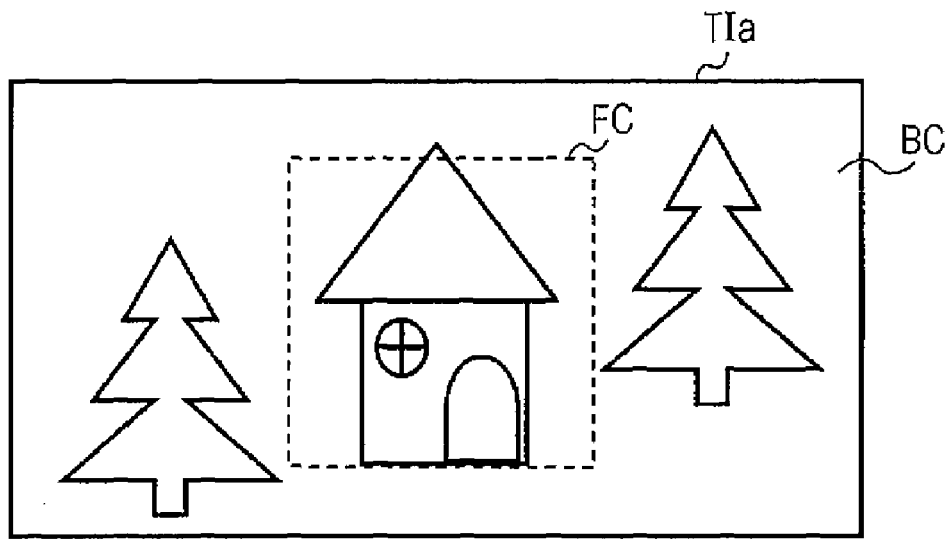
FIG. 14 is a diagram showing an example of a target image TIa for a background shading and printing process according to an embodiment of the invention.

In step S210 (FIG. 8), when the face area FA is not detected, the shading processing unit 540 identifies a focus area and the other areas in Step S400. The focus area FC is an area of the target image TIa in which the DSC 100 adjusts its focus by using an autofocus function (FIG. 2, step S160). In FIG. 14, the set focus area FC of the target image TIa and the other areas (background areas) BC thereof are shown.

In step S410, the subject distance acquiring unit 530 (FIG. 6) acquires the subject distance Sd. A method is used in which the subject distance Sd is acquired from the supplementary information stored in the memory card MC.

In step S420, the shading processing unit 540 performs an image process to increase the sharpness of the focus area FC relative to the other areas (background areas) BC. In particular, a process for increasing the contrast for the focus area FC is performed. Alternatively, the image process may perform a sharpening process for the focus area FC.

In step S430, the shading degree setting section 542 (FIG. 6) sets the degree of shading (shading intensity). The degree of shading is the degree (intensity) of the shading process that is performed for the background areas of the target image TIa. The shading degree setting section 542 sets the degree of shading based on the relationship between the degree of shading set in advance and the subject distance Sd.

Figure 15:
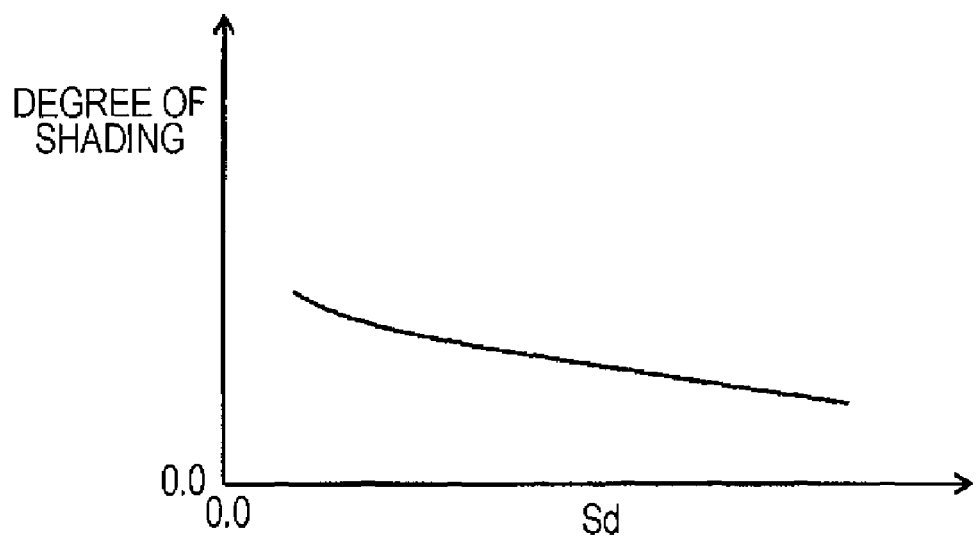
FIG. 15 is a graph showing a relationship between the degree of shading and the subject distance Sd according to an embodiment of the invention.

FIG. 15 is a graph showing a relationship between the degree of shading and the subject distance Sd. The horizontal axis represents the subject distance Sd, and the vertical axis represents the degree of shading. As shown in FIG. 15, the relationship between the degree of shading and the subject distance Sd is set such that the degree of shading increases as the subject distance Sd is increased. The relationship between the degree of shading and the subject distance Sd is set as shown in FIG. 15 as the subject distance Sd increases, and accordingly a natural and desirable shading process is achieved. The shading degree setting section 542 sets the degree of shading based on the subject distance Sd acquired in step S410 and the relationship shown in FIG. 15.

Figure 16A:
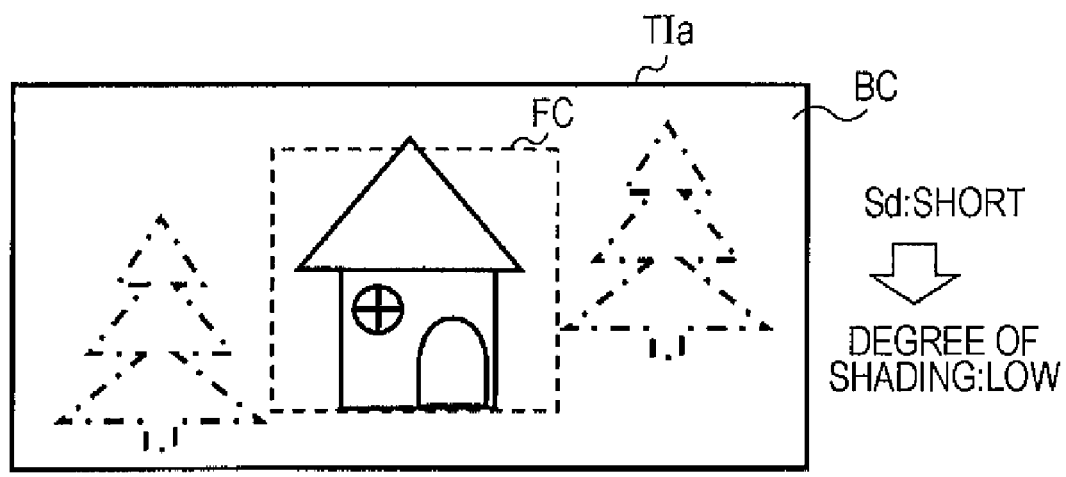
FIGS. 16A and 16B are diagrams showing an example of the target image TIa after the shading process according to an embodiment of the invention.
Figure 16B:
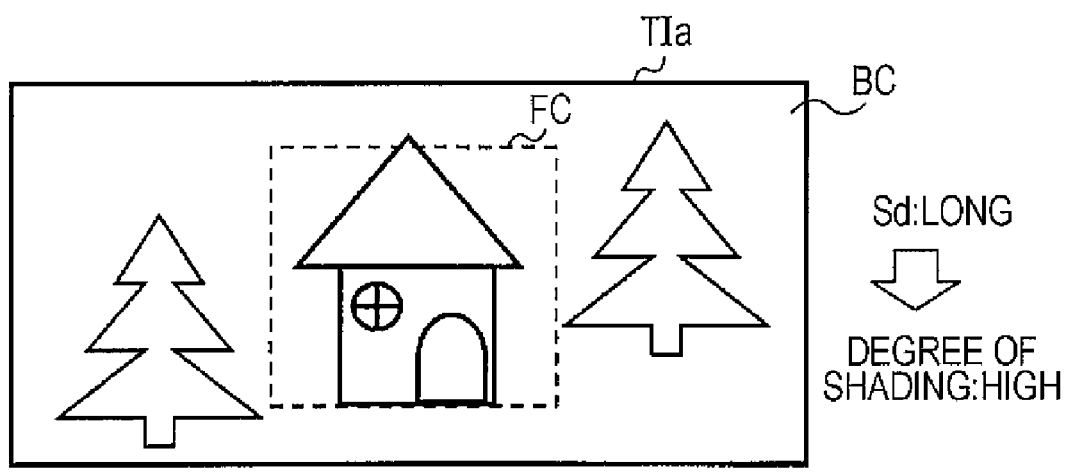

In step S430 (FIG. 8), the shading processing unit 540 (FIG. 6) performs the shading process. The shading processing unit 540 performs the image process such that the contrast for the image of the focus area FC is set in the target image TIa. In addition, the shading processing unit 540 performs the shading process for the background areas BC in accordance with the degree of shading set in Step S420. The shading process, for example, is performed by using a known method using a Gauss filter or the like. FIGS. 16A and 16B show an example of the target image TIa after the shading process. FIG. 16A shows a target image TIa after the shading process in a case where the subject distance Sd is relatively short. FIG. 16B shows a target image TIa after the shading process in a case where the subject distance Sd is relatively long. As shown in FIGS. 16A and 16B, in a case where the subject distance Sd is short, the degree of blurring of the image in an area other than the focus area increases.

The image after the shading process is thereafter displayed (step S230 of FIG. 8) and printed (step S240). The user can check the result of correction from the display unit 350 in which the target image TI after correction is displayed. When the user is not satisfied with the result of correction and selects the "back" button, a screen, for example, for selecting the type and degree of transformation is displayed in the display unit 350, and the type and degree of transformation is set again by the user. On the other hand, when the user is satisfied with the result of correction and selects the "print" button, a corrected image printing process described below is started.

In step S240 (FIG. 8), the print processing section 520 (FIG. 6) prints the target image TI after the face shape correcting process by controlling the printer engine 360. The print processing section 520 generates print data by performing a process such as a resolution converting process or a halftone process for the image data of the target image TI after the correction process. The generated print data is supplied to the printer engine 360 from the print processing section 520, and the printer engine 360 prints the target image TI. Accordingly, the print process for the target image TI after the correction is completed.

As described above, in the printer 300 of this embodiment, the degree of transformation (transformation amount) for the image transformation process is set such that the degree of transformation increases (the transformation amount increases) based on the estimated subject distance Sd, as the subject distance Sd is decreased. Then, the transformation process for the image is performed using the set transformation amount DQ. Accordingly, a transformation process for the image from which an impression of the subject acquired from observing the image becomes close to an impression acquired from observing the real subject is implemented.

A-3. Setting Transformation Area

Figure 17:
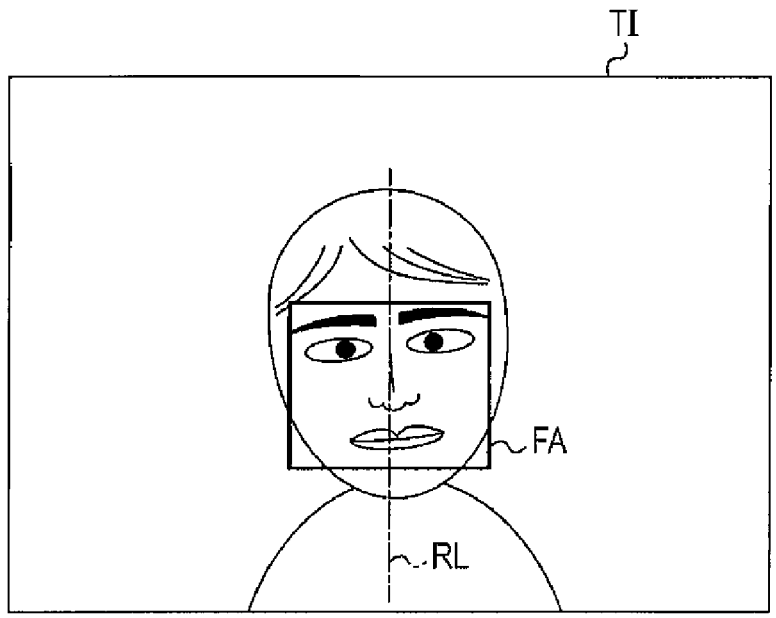
FIG. 17 is a diagram showing an example of the result of detection of a face area FA according to an embodiment of the invention.

The transformation area TA setting process (step S320 of FIG. 8) in the face shape correcting process is now described in detail. FIG. 17 shows an example of the result of detection of a face area FA. As shown in FIG. 17, in step S320, a face area FA has been detected from the target image TI. Reference line RL of FIG. 17 defines a height direction of the face area FA and represents the center of the face area FA in the width (horizontal) direction. The reference line RL is a straight line that passes through the center of the rectangular face area FA and is parallel to a boundary line along the height (vertical) direction of the face area FA.

The transformation area TA is set based on the face area FA. In the known method of detecting the face area FA that is used, such as a pattern matching method using a template or the like, positions and inclination (angles) of the entire face and parts of the face (eyes, a mouth, or the like) are not detected in detail. In the known method, an area in which an image of a face of the target image TI is considered to be included on the whole is set as the face area FA. The image of a face, generally, has high visibility for an observer, and thus, the image after the correction of the face shape may become unnatural depending on a relationship between the transformation area TA set based on the face area FA and the position and angle of the image of the face. Thus, in this embodiment, in order to achieve natural and desirable correction of the face shape, position and inclination adjustment are performed for the face area FA detected in step S320.

Figure 18:
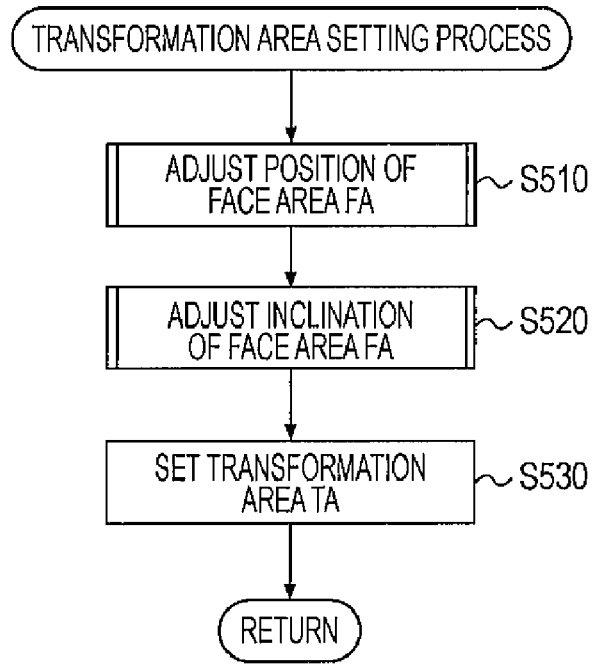
FIG. 18 is a flowchart of a transformation area setting process according to an embodiment of the invention.

FIG. 18 is a flowchart of the transformation area setting process. In step S510, the face area adjusting section 430 (FIG. 1) performs position adjustment of the face area FA detected in step S320 (FIG. 8) in the height direction. The position adjustment of the face area FA in the height direction represents that the face area FA of the target image TI is reset by adjusting positions along the reference line RL (FIG. 17) of the face area FA.

Figure 19:
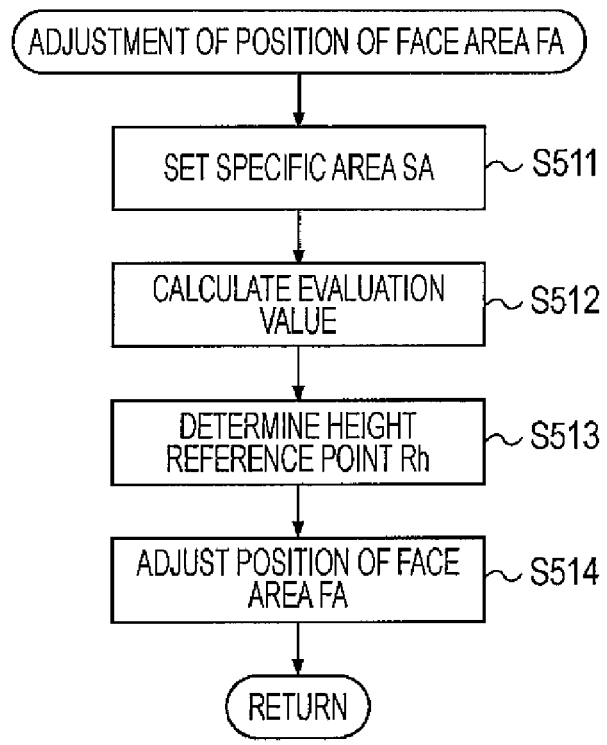
FIG. 19 is a flowchart of a position adjustment process for the face area FA in a height direction according to an embodiment of the invention.

FIG. 19 is a flowchart of the position adjustment process for the face area FA in the height direction. In step S511, the face area adjusting section 430 (FIG. 1) sets a specific area SA. The specific area SA is an area of the target image TI that includes an image of a predetermined reference subject that is referred to for performing position adjustment of the face area FA in the height direction. The reference subject, for example, may be set as "eyes". In such a case, the specific area SA is set as an area including the image of the eyes.

Figure 20:
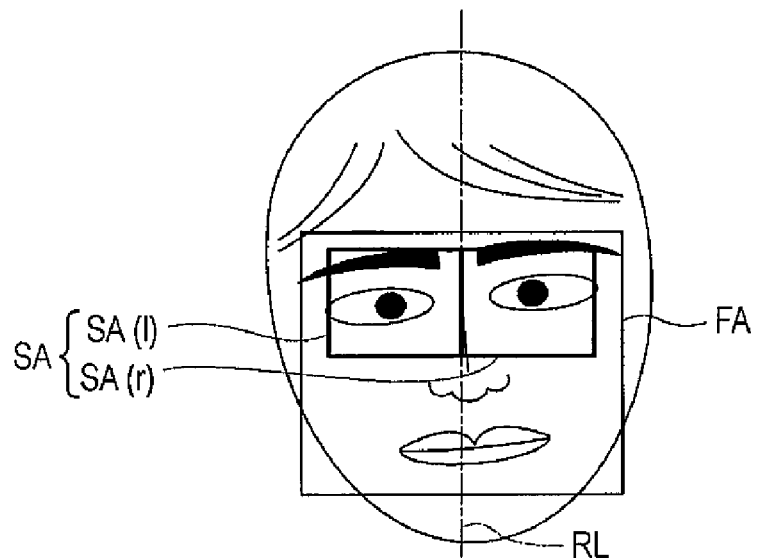
FIG. 20 is a diagram showing an example of a specific area SA according to an embodiment of the invention.

FIG. 20 shows an example of the specific area SA. In this embodiment, the face area adjusting section 430 (FIG. 1) sets the specific area SA based on a relationship with the face area FA. In particular, an area having a predetermined position relationship with the position of the face area FA having a size that is acquired by shrinking (or enlarging) the size of the face area FA at a predetermined ratio in a direction perpendicular or parallel to the reference line RL is set as the specific area SA. In other words, the predetermined ratio and position relationship are set in advance such that the specific area SA becomes an area including images of both eyes in a case where the specific area SA is set based on the relationship with the face area FA detected by the face area detecting unit 420. The specific area SA is preferably set as a smallest area that includes the images of the two eyes, so that an image (for example, an image of hairs) that can be confused with the image of the eyes is not included.

As shown in FIG. 20, the specific area SA has a rectangular shape symmetrical to the reference line RL. The specific area SA is divided by the reference line RL into an area on the observer's left side (left-division specific area SA(l)) and an area on the observer's right side (right-division specific area SA(r)). The specific area SA is set such that one eye is included in each of the left-division specific area SA(l) and the right-division specific area SA(r).

Figure 21:
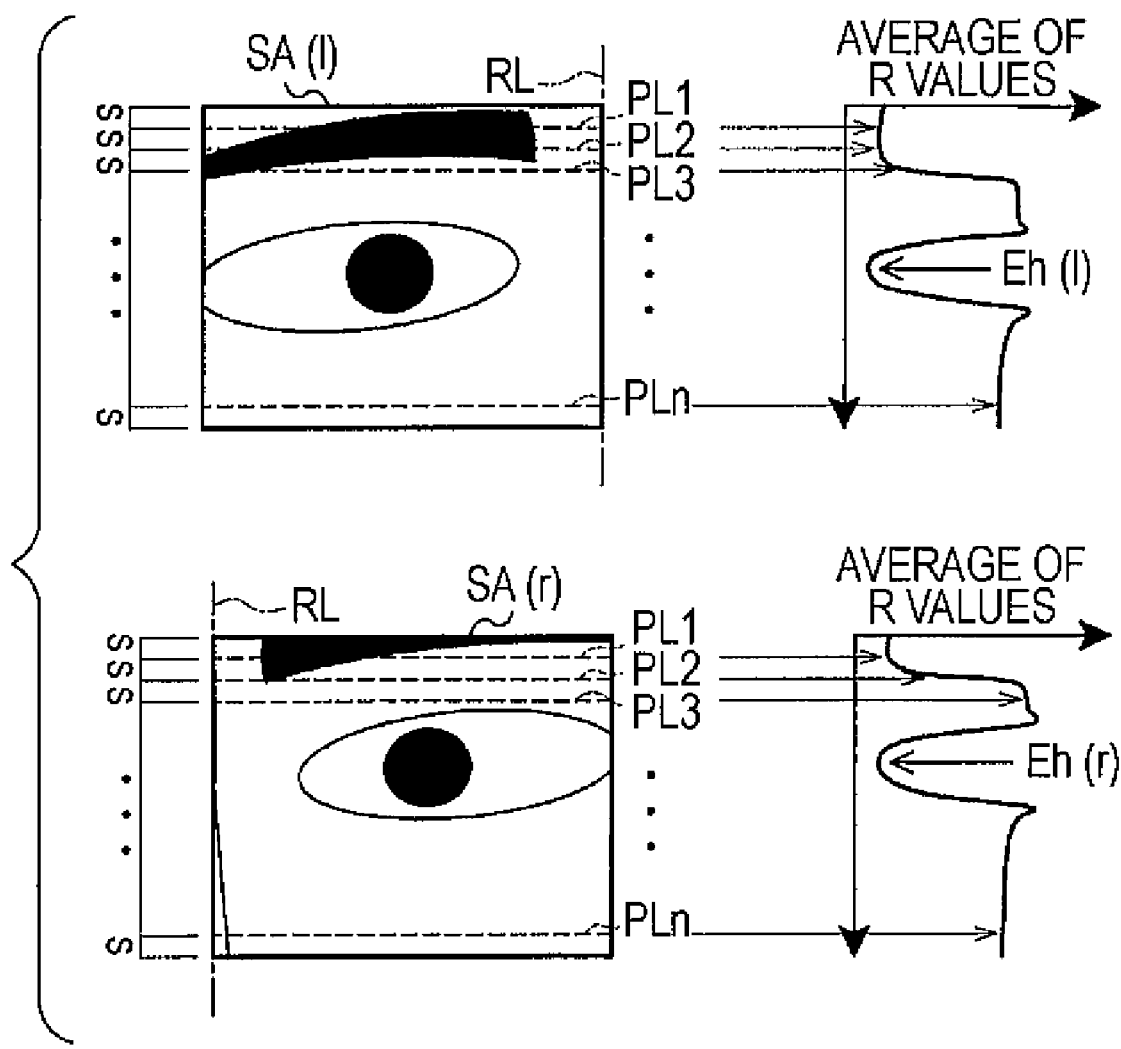
FIG. 21 is a diagram showing an example of a method of calculating an evaluation value according to an embodiment of the invention.

In step S512 (FIG. 19), the face area adjusting section 430 (FIG. 6) calculates an evaluation value used for detecting the position of the image of the eye in the specific area SA. FIG. 21 shows an example of a method of calculating the evaluation value. In this embodiment, R values (R component values) of pixels of the target image TI as RGB image data are used for calculating the evaluation value. There is a big difference between the R values of an image of a skin part and an image of an eye part. Thus, by using the R values for calculating the evaluation value, the precision of detection of the image of the eye is improved. In addition, in this embodiment, data of the target image TI is acquired as RGB data. Accordingly, by using the R values for calculating the evaluation value, calculation of the evaluation value is effectively performed. As shown in FIG. 21, calculation of the evaluation value is individually performed for the two divided specific areas (the right-division specific area SA(r) and the left-division specific area SA(l)).

The face area adjusting section 430, as shown in FIG. 21, sets n straight lines (target pixel specifying lines PL1-PLn) that are perpendicular to the reference line RL in the divided specific areas (the right-division specific area SA(r) and the left-division specific area SA(l)). The target pixel specifying lines PL1-PLn are straight lines that equally divide the height (the size along the reference line RL) of the divided specific area into (n+1) divisions. In other words, intervals between the target pixel specifying lines PL are the same.

The face area adjusting section 430 selects pixels (evaluation target pixels TP) that are used for calculating the evaluation value from among pixels constituting the target image TI for each of the target pixel specifying lines PL1-PLn. FIGS. 22A and 22B show an example of a method of selecting the evaluation target pixels TP. The face area adjusting section 430 selects pixels overlapped with the target pixel specifying lines PL as the evaluation target pixels TP from among the pixels constituting the target image TI. FIG. 22A shows a case where the target pixel specifying lines PL are parallel to the row direction X of the pixels of the target image TI. In such a case, pixels denoted by the mark "o" in FIG. 22A on the pixel rows overlapped with each target pixel specifying line PL are selected as the evaluation target pixels TP for each target pixel specifying line PL.

On the other hand, depending on the method of detecting the face area FA or the method of setting the specific area SA, as shown in FIG. 22B, there may be a case where the target pixel specifying lines PL are not parallel to the row direction X of the pixels of the target image TI. Even in such a case, basically, pixels overlapping each target pixel specifying line PL are selected as the evaluation target pixels TP for each target pixel specifying line PL. However, for example, similar to relationships between the target pixel specifying line PL1 and pixels PXa and PXb shown in FIG. 22B, when a target pixel specifying line PL is overlapped with two pixels located in a same row (that is, pixels having same Y coordinates) of a pixel matrix of the target image TI, a pixel (for example, the pixel PXb) having a shorter length of an overlapped part is excluded from the evaluation target pixel TP. In other words, for each target pixel specifying line PL, only one pixel is selected from one row of the pixel matrix as the evaluation target pixel TP.

When the inclination of the target pixel specifying line PL exceeds 45 degrees with respect to direction X, a relationship between a column of the pixel matrix and a row is reversed in the above description, and thus only one pixel from one row of the pixel matrix is selected as the evaluation target pixel TP. Depending on a size relationship between the target pixel TI and the specific area SA, one pixel may be selected as the evaluation target pixels TP for a plurality of the target pixel specifying lines PL.

The face area adjusting section 430 calculates an average of R values of the evaluation target pixels TP as the evaluation value for each target pixel specifying line PL. However, in this embodiment, for each target pixel specifying line PL, a part of pixels of the selected plurality of the evaluation target pixels that have large R values is excluded from the target used for calculating the evaluation value. In particular, for example, when k evaluation target pixels TP are selected for a target pixel specifying line PL, the evaluation target pixels are divided into two groups including a first group that is constituted by 0.75 k pixels having relatively large R values and a second group constituted by 0.25 k pixels having relatively small R values. Then, R values of only pixels belonging to the second group as evaluation values become the target used for calculating the average. The reason that a part of the evaluation target pixels TP is excluded from the target used for calculating the evaluation value is described later.

As described above, in this embodiment, the evaluation value for each target pixel specifying line PL is calculated by the face area adjusting section 430. The target pixel specifying line PL is a straight line that is perpendicular to the reference line RL, and thus, the evaluation value can be represented as a value calculated for a plurality of positions (evaluation positions) along the reference line RL. In addition, the evaluation value may be represented as a value showing a characteristic of distribution of pixel values along the direction perpendicular to the reference line RL.

In step S513 (FIG. 19), the face area adjusting section 430 (FIG. 6) detects the position of an eye in the specific area SA and determines a height reference point Rh based on the result of detection. First, the face area adjusting section 430, as shown in FIG. 21 on the right side, generates a curve that represents a distribution of evaluation values (averages of the R values) along the reference line RL for each divided specific area and detects a position along the direction of the reference line RL that has a local minimum evaluation value as the position Eh of the eye. The position Eh of the eye in the left-division specific area SA(l) is denoted by Eh(l), and the position Eh of the eye in the right-division specific area SA(r) is denoted by Eh(r).

For the yellow human race, a part representing an image of a skin in the divided specific area has a large R value, and a part representing an image of an eye (more particularly, a black pupil part located in the center of the eye) has a small R value. Thus, as described above, it is possible to determine the position along the reference line RL having the local minimum evaluation value (average of the R values) as the position Eh of the eye. However, for other human races (such as white or black), different evaluation values (for example, luminance, brightness, or the B value) are used.

As shown in FIG. 21, in the divided specific area, there is a case where an image (for example, an image of eyebrows or hairs) other than the image of the eye that has a small R value is included. Thus, when the curve representing distribution of evaluation values along the reference line RL has a plurality of local minimum values, the face area adjusting section 430 determines a position, which is located on the lowest side, of the positions having the local minimum values as the position Eh of the eye. Such a determination can be made based on that an image such as an image of eyebrows or hairs generally having a small R value is frequently located on the upper side of the image of the eye and an image having a small R value is located less frequently on the lower side of the image of the eye.

The curve may have a large evaluation value and a local minimum value on a side (mainly, a position corresponding to an image of skin) lower than the position of the image of the eye, and thus, a value, which is larger than a predetermined threshold value, of the local minimum values may be configured to be ignored. Alternatively, in a simple manner, the position of the target pixel specifying lint PL corresponding to a minimum value of the evaluation values calculated for each target pixel specifying line PL may be considered as the position Eh of the eye.

In addition, in this embodiment, the eye (a black pupil part of the center of the eye) that has a relatively big color difference from an adjacent area in the face is used as the reference subject for position adjustment of the face area FA. The average of the R values as the evaluation value is calculated by using the plurality of the evaluation target pixels TP located on the target pixel specifying line PL. Accordingly, for example, the precision of detection of the black pupil part may be decreased due to influence of an image of a white part located on the edge of the black pupil part. In this embodiment, as described above, the precision of detection of the reference subject is improved by excluding a part of the evaluation target pixels TP (for example, pixels that belong to the above-described first group and have relatively large R values) that have a big color difference from the reference subject from the target used for calculating the evaluation value.

Next, the face area adjusting section 430 determines a height reference point Rh based on the detected position Eh of the eye. FIG. 23 shows an example of a method of determining the height reference point Rh. The height reference point Rh is used as a reference for position adjustment of the face area FA in the height direction. In this example, as shown in FIG. 23, a point located in the center of the positions Eh(l) and Eh(r) of the left and right eyes that is on the reference line RL is set as the height reference point Rh. In other words, a middle point of an intersection between a straight line EhL(l) representing the position Eh(l) of the left eye and the reference line RL and an intersection between a straight line EhL (r) representing the position Eh(r) of the right eye and the reference line RL is set as the height reference point Rh.

Figure 24:
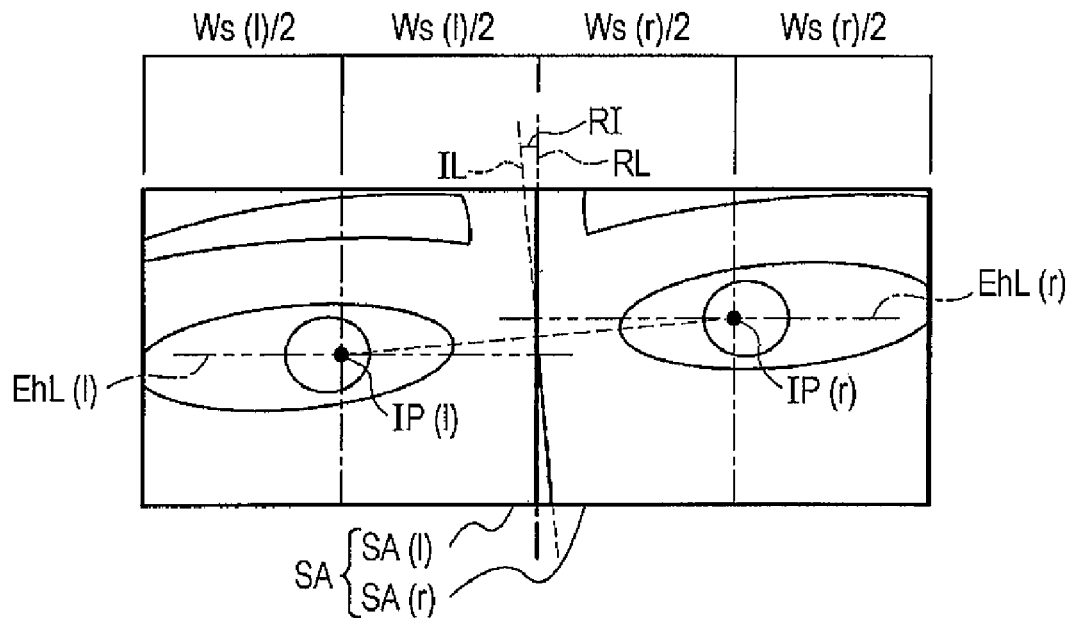
FIG. 24 is a diagram showing an example of a method of calculating a rough inclination angle RI according to an embodiment of the invention.

In addition, in this embodiment, the face area adjusting section 430 calculates a rough inclination angle RI of the face image based on the detected position Eh of the eye. The rough inclination angle RI is used for estimating the degree of inclination of the image of the face included in the target image TI with respect to the reference line RL of the face area FA on the whole. FIG. 24 shows an example of a method of calculating the rough inclination angle RI. First, the face area adjusting section 430 determines an intersection IP(l) between a straight line dividing the width Ws(l) of the left-division specific area SA(l) in half and the straight line EhL(l) and an intersection IP(r) between a straight line dividing the width Ws(r) of the right-division specific area SA(r) in half and the straight line EhL(r). An angle formed by a straight line IL perpendicular to a straight line connecting the intersection IP(l) and the intersection IP(r) and the reference line RL is then calculated as the rough inclination angle RI.

Figure 25:
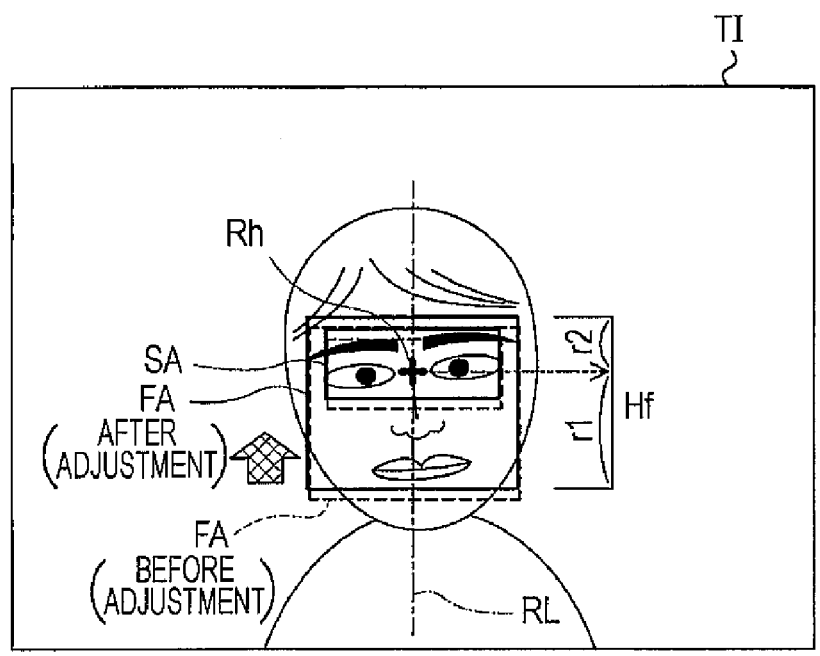
FIG. 25 is a diagram showing an example of a method of adjusting the position of the face area FA in the height direction according to an embodiment of the invention.

In step S514 (FIG. 19), the face area adjusting section 430 (FIG. 6) performs position adjustment of the face area FA in the height direction. FIG. 25 shows an example of a method of adjusting the position of the face area FA in the height direction. The position adjustment of the face area FA in the height direction is performed by resetting the face area FA such that the height reference point Rh is located in a predetermined position of the face area FA after position adjustment. In particular, as shown in FIG. 25, the position of the face area FA is vertically adjusted along the reference line RL such that the height reference point Rh is located in a position for dividing the height Hf of the face area FA at a predetermined ratio of r1 to r2. In the example shown in FIG. 25, by moving the face area FA before adjustment denoted by a broken line upward, the face area FA after adjustment denoted by a solid line is reset.

After performing the position adjustment of the face area FA, in step S520 (FIG. 18), the face area adjusting section 430 (FIG. 6) performs inclination (angle) adjustment of the face area FA. The inclination adjustment of the face area FA represents resetting the face area FA by adjusting the inclination of the face area FA in the target image TI to be appropriate for the inclination of the face image. In this embodiment, a predetermined reference subject that is referred to for adjusting the angle of the face area FA is set as two eyes. In the inclination adjustment of the face area FA, a plurality of evaluation directions that represent options of adjustment angles of the inclination adjustment is set, and the evaluation specific area ESA corresponding to each evaluation direction is set as an area including the image of the two eyes. An evaluation value is calculated based on the pixel value of an image of the evaluation specific area ESA for each evaluation direction, and the inclination of the face area FA is adjusted by using an adjustment angle for inclination adjustment that is determined based on the evaluation value.

Figure 26:
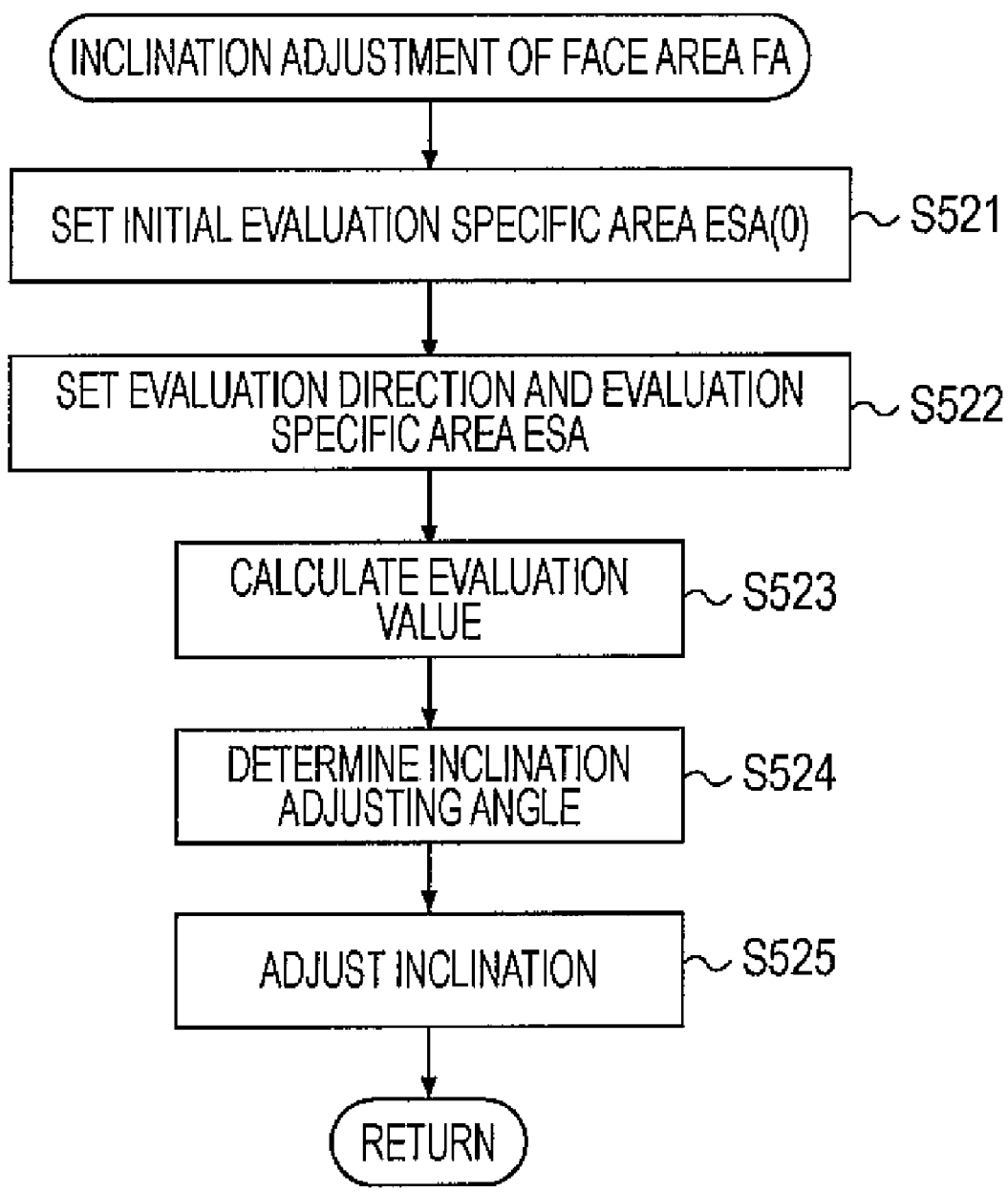
FIG. 26 is a flowchart of an inclination adjusting process for the face area FA according to the first embodiment.
Figure 27:
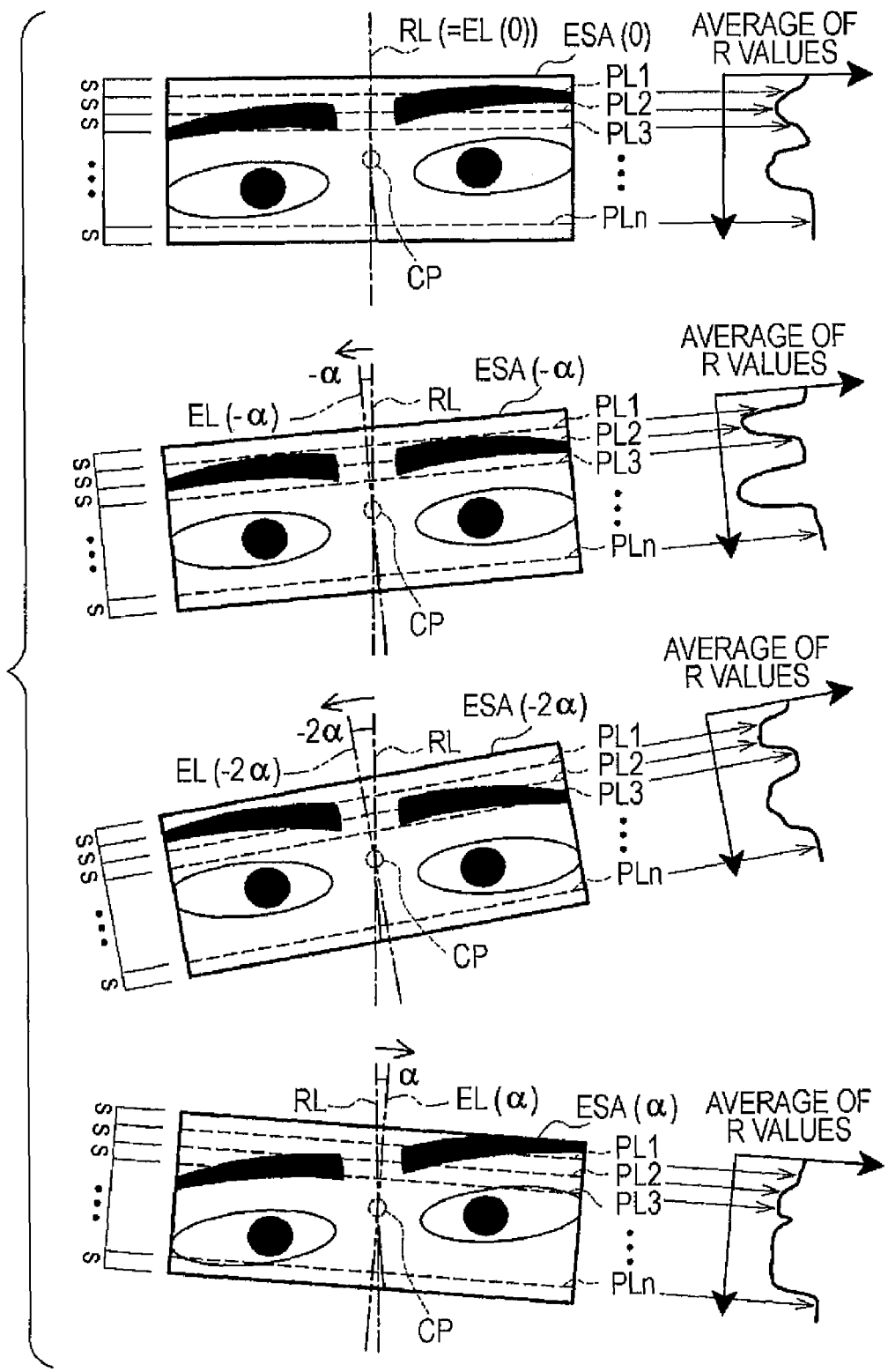
FIG. 27 is a diagram showing an example of calculating an evaluation value used for inclination adjustment of the face area FA according to an embodiment of the invention.

FIG. 26 is a flowchart of the inclination adjusting process for the face area FA according to the first embodiment. FIG. 27 shows an example of calculating an evaluation value used for inclination adjustment of the face area FA. In step S521 (FIG. 26), the face area adjusting section 430 (FIG. 6) sets an initial evaluation specific area ESA(0) corresponding to an initial evaluation direction that is parallel to the reference line RL (FIG. 25) of the face area FA after position adjustment. In this embodiment, the specific area SA (FIG. 25) corresponding to the face area FA after position adjustment is directly set as the initial evaluation specific area ESA(0). The evaluation specific area ESA for the inclination adjusting process for the face area FA is not divided into left and right areas, differently from the specific area SA for the position adjusting process for the face area FA. The set initial evaluation specific area ESA(0) is shown in the uppermost part in FIG. 27.

In step S522 (FIG. 26), the face area adjusting section 430 (FIG. 6) sets a plurality of evaluation directions and evaluation specific areas ESA corresponding to the evaluation directions. The evaluation directions represent options of the adjustment angles for inclination adjustment. In this embodiment, a plurality of evaluation direction lines EL having angles formed with the reference line RL in a predetermined range is set, and directions parallel to the evaluation direction lines EL are set as the evaluation directions. As shown in FIG.

27, straight lines that are defined by rotating the reference line RL about the center point (center) CP of the initial evaluation specific area ESA(0) in the counterclockwise direction and the clockwise direction by angle α are set as the plurality of the evaluation direction lines EL. An evaluation direction line EL that has an angle of φ formed with the reference line RL is denoted by EL(φ).

In this embodiment, the predetermined range of the angles formed by the evaluation direction lines EL and the reference line RL is set as ±20 degrees. A rotation angle for a case where the reference line RL is rotated in the clockwise direction is represented by a positive value, and a rotation angle for a case where the reference line RL is rotated in the counterclockwise direction is represented by a negative value. The face area adjusting section 430 sets the plurality of the evaluation direction lines EL by rotating the reference line RL in the counterclockwise and clockwise directions with the rotation angle increased in a range not exceeding 20 degrees including α degrees, 2α degrees, etc. Evaluation direction lines EL (EL(−α), EL(−2α), and (EL(α)) that are determined by rotating the reference line RL by (−α) degrees, (−2α) degrees, and a degrees are shown in FIG. 27. The reference line RL can be represented by the evaluation direction line EL(0).

The evaluation specific area ESA corresponding to the evaluation direction line EL representing each evaluation direction is acquired by rotating the initial evaluation specific area ESA(0) about the center point CP by a same angle as the rotation angle for setting the evaluation direction line EL. The evaluation specific area ESA corresponding to the evaluation direction line EL(φ) is represented by the evaluation specific area ESA(φ). The evaluation specific areas ESA (ESA(−α), ESA(−2α), and ESA(α)) corresponding to the evaluation direction lines EL(−α), EL(−2α), and EL(α) are shown in FIG. 27. The initial evaluation specific area ESA(0) is treated as one of the evaluation specific areas ESA.

In step S523 (FIG. 26), the face area adjusting section 430 (FIG. 6) calculates the evaluation value for each of the set plurality of the evaluation directions based on a pixel value of the image of the evaluation specific area ESA. In this embodiment, an average of the R values is used as an evaluation value for inclination adjustment of the face area FA, similar to the above-described evaluation value for position adjustment of the face area FA. The face area adjusting section 430 calculates the evaluation values for the plurality of evaluation positions along the evaluation directions.

The method of calculating the evaluation values is the same as that of calculating the evaluation values for the above-described position adjustment of the face area FA. In other words, the face area adjusting section 430, as shown in FIG. 27, sets target pixel specifying lines PL1-PLn that are perpendicular to the evaluation direction lines EL within each evaluation specific area ESA, selects evaluation target pixels TP for each target pixel specifying lines PL1-PLn, and calculates an average of R values of the selected evaluation target pixels TP as the evaluation value.

A method of setting the target pixel specifying line PL in the evaluation specific area ESA and a method of selecting the evaluation target pixels TP are similar to those for the position adjustment of the face area FA of FIGS. 21 and 22 with a difference in whether the area is divided into left and right areas. In addition, as in the position adjusting process for the face area FA, a part of the selected evaluation target pixels TP (for example, 0.75 k pixels, which have relatively large R values, of k evaluation target pixels TP) may be excluded from the target used for calculating the evaluation value. A distribution of the calculated evaluation values along the evaluation direction line EL of the calculated evaluation value for each evaluation direction is shown on the right side of FIG. 27.

Since the target pixel specifying line PL is a straight line perpendicular to the evaluation direction lines EL, the evaluation value can be represented to be calculated for a plurality of evaluation positions along the evaluation direction lines EL. In addition, the evaluation value can be represented to show the characteristic of distribution of pixel values along a direction perpendicular to the evaluation direction lines EL.

In step S524 (FIG. 26), the face area adjusting section 430 (FIG. 6) determines an adjustment angle used for inclination adjustment of the face area FA. The face area adjusting section 430 calculates distribution of the evaluation values calculated in step S523 along the evaluation direction line EL of the evaluation value calculated in Step S523 for each evaluation direction and selects an evaluation direction for which the value of dispersion is the maximum. Then, the face area adjusting section 430 determines an angle formed by the evaluation direction line EL corresponding to the selected evaluation direction and the reference line RL as the adjustment angle used for inclination adjustment.

Figure 28:
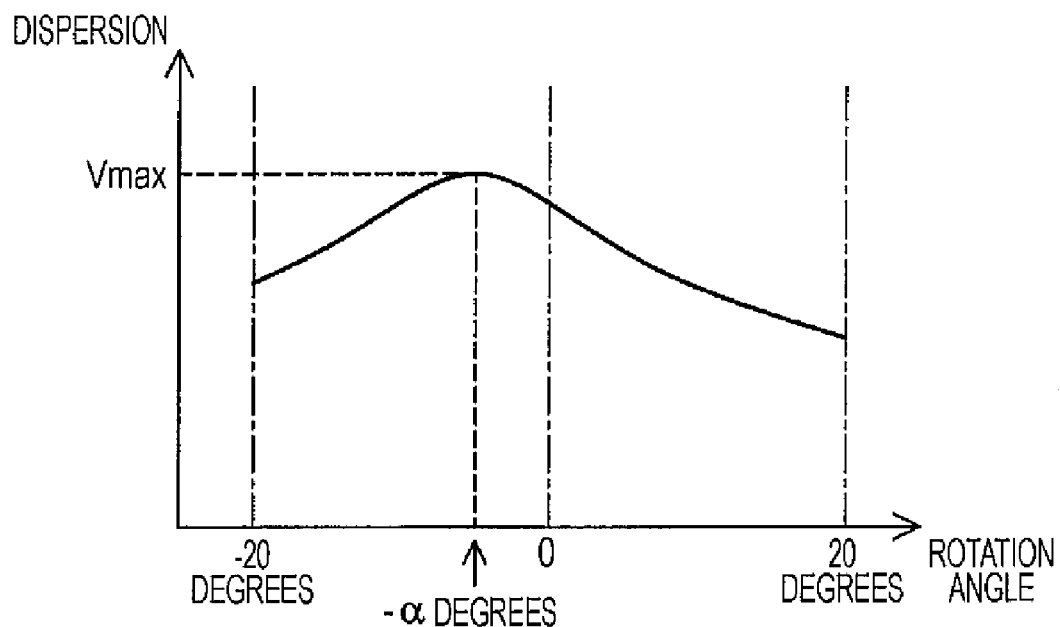
FIG. 28 is a diagram showing an example of a result of calculation of dispersion of evaluation values for each evaluation direction according to an embodiment of the invention.

FIG. 28 shows an example of the result of calculation of dispersion of evaluation values for each evaluation direction. In FIG. 28, the dispersion has the maximum value Vmax for the evaluation direction having the rotation angle of −α degrees. Accordingly, −α degrees, that is, the rotation angle of α in the counterclockwise direction, is determined as the adjustment angle used for inclination adjustment of the face area FA.

The reason that the angle corresponding to the evaluation direction for which the value of the dispersion of evaluation values becomes the maximum is determined as the adjustment angle used for inclination adjustment is now described. As shown in the second step from the upper side FIG. 27, in the evaluation specific area ESA(−α) at the rotation angle of −α degrees, the images of center parts (black pupil parts) of the left and right eyes are aligned on the whole in a direction parallel to the target pixel specifying line PL on the whole (that is, a direction perpendicular to the evaluation direction line EL). In such a case, the images of the left and right eyebrows are aligned on the whole in a direction perpendicular to the evaluation direction line EL. Accordingly, the evaluation direction corresponding to the evaluation direction line EL is considered to be the direction representing the inclination of the face image on the whole. In such a case, the position relationship between the image of the eye or eyebrow generally having a small R value and the image of a skin part generally having a large R value is formed such that an overlapped part thereof along the direction of the target pixel specifying line PL is small. Thus, the evaluation value in a position of the image of the eye or the eyebrow becomes relatively small, and the evaluation value in a position of the image of the skin part becomes relatively large. Accordingly, the distribution of evaluation values along the evaluation direction line EL, as shown in FIG. 27, has a relatively big difference (large amplitude), and thus the value of dispersion becomes large.

On the other hand, as shown in the uppermost step, and the third and fourth steps from the upper side in FIG. 27, in the evaluation specific areas ESA(0), ESA(−2α), and ESA(α) at the rotation angles of 0 degrees, −2α degrees and α degrees, the center parts of the left and right eyes and the images of the left and right eyebrows are not aligned in a direction perpendicular to the evaluation direction line EL and are deviated from the direction. Accordingly, the evaluation direction corresponding to the evaluation direction line EL for such cases does not represent the inclination of the face image. In such a case, a position relationship between the image of the eye and the eyebrow and the image of a skin part is formed such that and overlapped part of the images along the target pixel specifying line PL is large. Accordingly, the distribution of evaluation values along the evaluation direction line EL, as shown in FIG. 27, becomes a distribution having a relatively small difference (small amplitude), and accordingly the value of dispersion becomes small.

As described above, when the evaluation direction is close to the direction of the inclination of the face image, the value of dispersion of evaluation values along the evaluation direction line EL becomes large. On the other hand, when the evaluation direction is far from the direction of the inclination of the face image, the value of dispersion of evaluation values along the evaluation direction line EL becomes small. Thus, by determining the angle corresponding to the evaluation direction for which the value of dispersion of the evaluation values becomes the maximum as an adjustment angle used for inclination adjustment, inclination adjustment of the face area FA in which the inclination of the face area FA is appropriate for the inclination of the image of the face can be performed.

In addition, in this embodiment, when the calculated result of dispersion of the evaluation values has the maximum value at the threshold value of the range of angles, that is, −20 degrees or 20 degrees, there is a high probability that the inclination of the face is not precisely evaluated. Thus, in such a case, the inclination adjustment of the face area FA is not performed.

In this embodiment, the determined adjustment angle is compared with the above-described rough inclination angle RI calculated for position adjustment of the face area FA. When a difference between the adjustment angle and the rough inclination angle RI is larger than a predetermined threshold value, an error is considered to occur in an evaluation or determination process for position adjustment or the inclination adjustment of the face area FA. Thus, the position and inclination adjustment of the face area FA are not performed.

Figure 29:
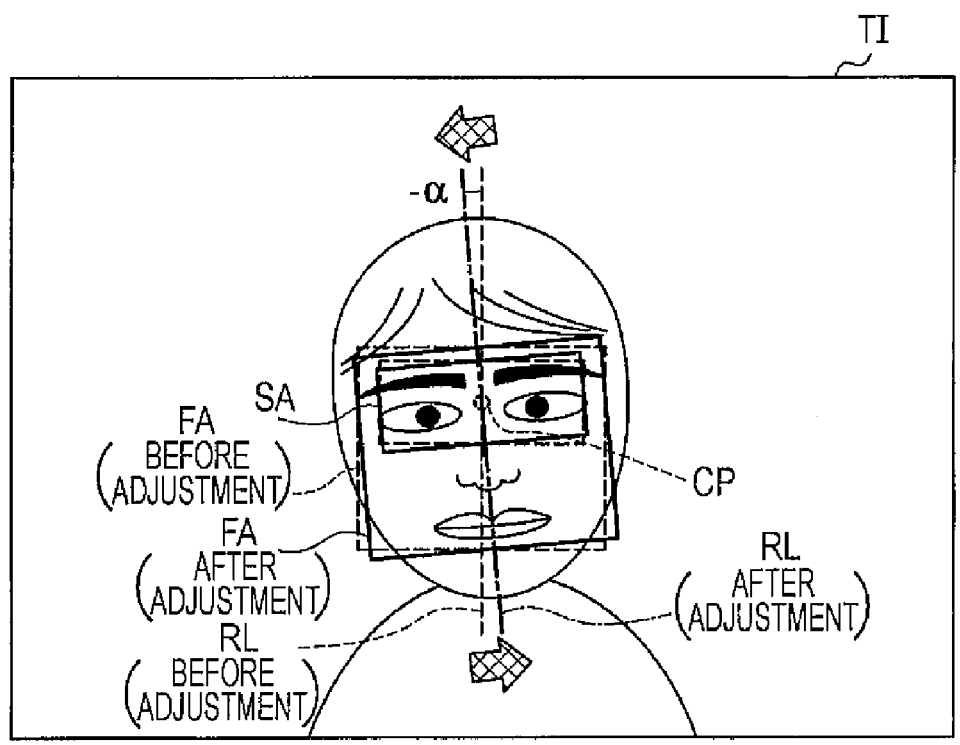
FIG. 29 is a diagram showing an example of a method of adjusting inclination of the face area FA according to an embodiment of the invention.

In step S525 (FIG. 26), the face area adjusting section 430 (FIG. 6) performs inclination adjustment of the face area FA. FIG. 29 shows an example of a method of adjusting inclination of the face area FA. The inclination adjustment of the face area FA is performed by rotating the face area FA around the center point CP of the initial evaluation specific area ESA(0) by the adjustment angle determined in step S524. In FIG. 29, by rotating the face area FA before adjustment denoted by a broken line in the counterclockwise direction by α degrees, the face area FA after adjustment denoted by a solid line is set.

Figure 30:
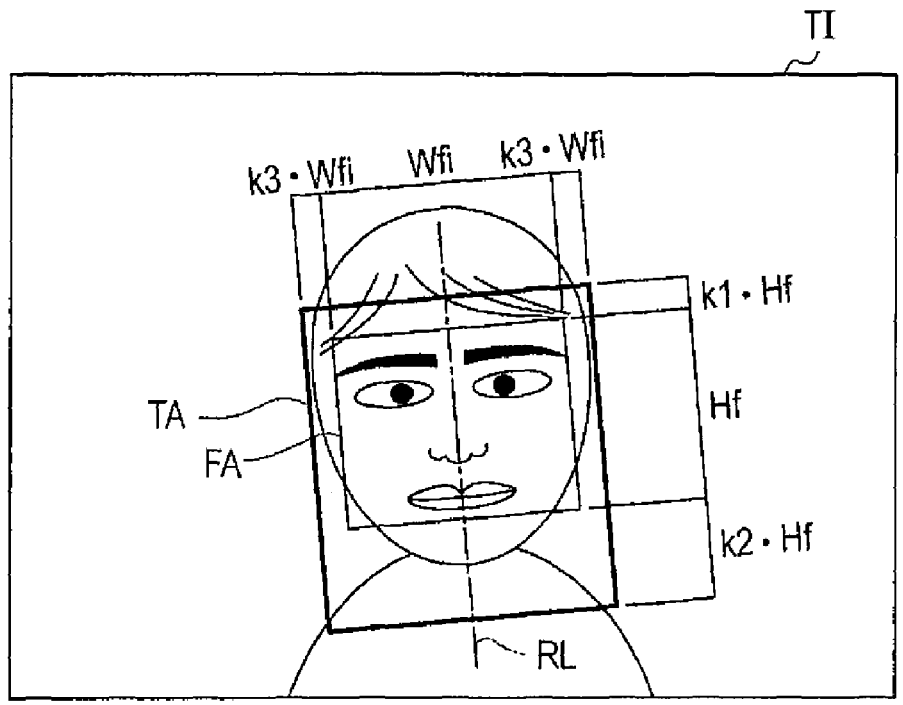
FIG. 30 is a diagram showing an example of a method of setting a transformation area TA according to an embodiment of the invention.

In step S530 (FIG. 18) after completion of the inclination adjustment of the face area FA, the transformation area setting section 440 (FIG. 6) sets a transformation area TA. The transformation area TA is an area of the target image TI and becomes a target for an image transformation process for correcting the face shape. FIG. 30 shows an example of a method of setting the transformation area TA. As shown in FIG. 30, in this embodiment, the transformation area TA is acquired by enlarging (shrinking) the face area FA in a height direction parallel to the reference line RL and in a width direction perpendicular to the reference line RL. In particular, when the size of the face area FA in the height direction is denoted by Hf and the size of the face area in the width direction is denoted by Wf, an area acquired from enlarging the face area FA upward by k1·Hf and downward by k2·Hf and enlarging the face area FA to left and right sides by k3·Wf is set as the transformation area TA. Here, k1, k2, and k3 are predetermined coefficients.

When the transformation area TA is set as described above, the reference line RL that is a straight line parallel to the contour line of the face area FA in the height direction becomes a straight line parallel to the contour line of the transformation area TA in the height direction. In addition, the reference line RL becomes a straight line dividing the width of the transformation area TA in half.

As shown in FIG. 30, the transformation area TA is set to include an image from the chin to the forehead on the whole in the height direction and to include images of the left and right cheeks in the width direction. In other words, in this embodiment, the coefficients k1, k2, and k3 are set in advance based on the size relationship of the face area FA such that the transformation area TA becomes an area including the above-described range of images on the whole.

A-4. Transformation Process

Figure 31:
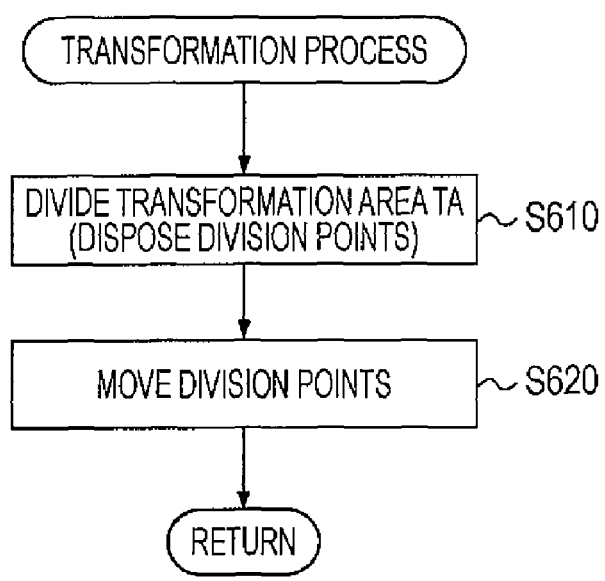
FIG. 31 is a flowchart of a transformation process according to an embodiment of the invention.
Figures 32, 33:
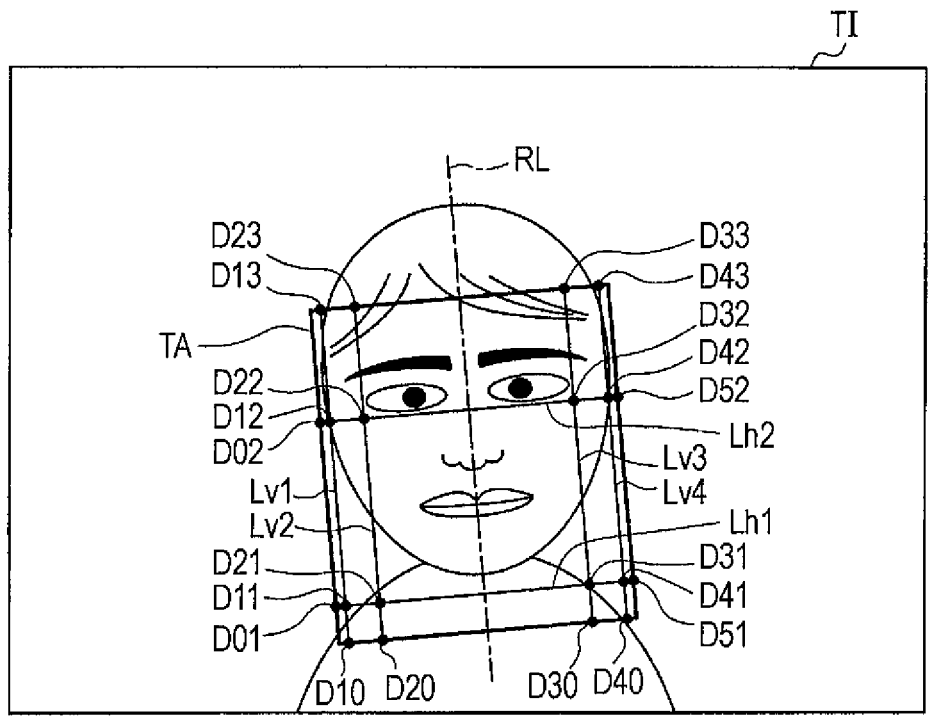
FIG. 32 is a diagram showing an example of a method of dividing the transformation area TA into sub areas according to an embodiment of the invention.
FIG. 33 is an example of a division point moving table according to an embodiment of the invention.

The transformation process (step S360) in the face shape correcting process (FIG. 8) is now described in detail. FIG. 31 is a flowchart of the transformation process. In step S610, the transformation area dividing section 450 (FIG. 6) divides the transformation area TA into a plurality of small sub areas. FIG. 32 shows an example of a method of dividing the transformation area TA into sub areas. The transformation area dividing section 450 divides the transformation area TA into a plurality of the sub areas by disposing a plurality of division points D in the transformation area TA and using a straight light connecting the division points D.

The disposition pattern (the number and positions) of the division points D is defined in correspondence with the transformation type set in step S310 (FIG. 8) by the division point disposing pattern table 610 (FIG. 6). The transformation area dividing section 450 disposes the division points D in a pattern corresponding to the transformation type set in step S310 with reference to the division point disposing pattern table 610. In this embodiment, as described above, since transformation type A (see FIG. 9) for sharpening the face is set as the transformation type, the division points D are disposed in the pattern corresponding to this transformation type.

As shown in FIG. 32, the division points D are disposed in intersections of horizontal division lines Lh and vertical division lines Lv and intersections of the horizontal and vertical division lines Lh and Lv and outer side lines of the transformation area TA. The horizontal division lines Lh and the vertical division lines Lv are reference lines for disposing the division points D within the transformation area TA. As shown in FIG. 32, in disposition of the division points D corresponding to the transformation type for sharpening the face, two horizontal division lines Lh perpendicular to the reference line RL and four vertical division lines Lv parallel to the reference line RL are set. The two horizontal division lines Lh are referred to as Lh1 and Lh2 in order from the lower side of the transformation area TA. The four vertical division lines Lv are referred to as Lv1, Lv2, Lv3, and Lv4 in order from the left side of the transformation area TA.

The horizontal division line Lh1 is disposed below the image of the chin in the transformation area TA, and the horizontal division line Lh2 is disposed right below the image of the eye. The vertical division lines Lv1 and Lv4 are disposed on the outer side of the images of the cheek lines, and the vertical division lines Lv2 and Lv3 are disposed on the outer side of the images of the tails of the eyes. Disposition of the horizontal division line Lh and the vertical division line Lv is performed in accordance with the correspondence relationship of the size of the transformation area TA set in advance, so that the position relationship between the horizontal and vertical division lines Lh and Lv and the images consequently becomes the above-described position relationship.

In accordance with the disposition of the horizontal and vertical division lines Lh and Lv, the division points D are disposed in the intersections of the horizontal and vertical division lines Lh and Lv, and the intersections of the horizontal and vertical division lines Lh and Lv and the outer frame of the transformation area TA. As shown in FIG. 32, the division points D located on the horizontal division line Lh1 (i=1 or 2) are referred to as D0$i$, D1$i$, D2$i$, D3$i$, D4$i$, and D5$i$ in order from the left side. For example, the division points D located on the horizontal division line Lh1 are referred to as D01, D11, D21, D31, D41, and D51. Similarly, the division points D located on the vertical division lines Lvj (j=1, 2, 3, or 4) are referred to as Dj0, Dj1, Dj2, and Dj3 in order from the lower side. For example, the division points D located on the vertical division line Lv1 are referred to as D10, D11, D12, and D13.

As shown in FIG. 32, disposition of the division points D in this embodiment is symmetrical to the reference line RL.

The transformation area dividing section 450 divides the transformation area TA into a plurality of sub areas by straight lines connecting the disposed division points D (the horizontal and vertical division lines Lh and Lv). In this embodiment, as shown in FIG. 32, the transformation area TA is divided into 15 rectangular sub areas:

In this embodiment, disposition of the division points D is determined by the numbers and positions of the horizontal and vertical division lines Lh and Lv, and thus it can be paraphrased that the division point disposing pattern table 610 defines the numbers and positions of the horizontal and vertical division lines Lh and Lv.

In step S620 (FIG. 31), the division area transforming section 460 (FIG. 6) performs an image transformation process for the transformation area TA of the target image TI. The transformation process using the division area transforming section 460 is performed by transforming the sub areas by moving the positions of the division points D disposed within the transformation area TA in step S610.

The movement pattern (movement direction and distance) of the position of each division point D for the transformation process is determined in advance in correspondence with a combination of the transformation type and the degree of transformation, which are set in step S310 (FIG. 8), by the division point moving table 620 (FIG. 6). The division area transforming section 460 moves the positions of the division points D in the movement direction and distance corresponding to the combination of the transformation type and the degree of transformation set in step S120, with reference to the division point moving table 620.

When transformation type A (FIG. 9) for sharpening the face is set as the transformation type and "medium" is set as the degree of transformation, the positions of the division points D are moved in movement directions and distances corresponding to the combination of the transformation type and the degree of transformation.

When "automatic" is selected as the degree of transformation, the movement directions and distances of the division points D are determined based on the transformation amounts DQ set by the transformation amount setting section 490.

Figure 34:
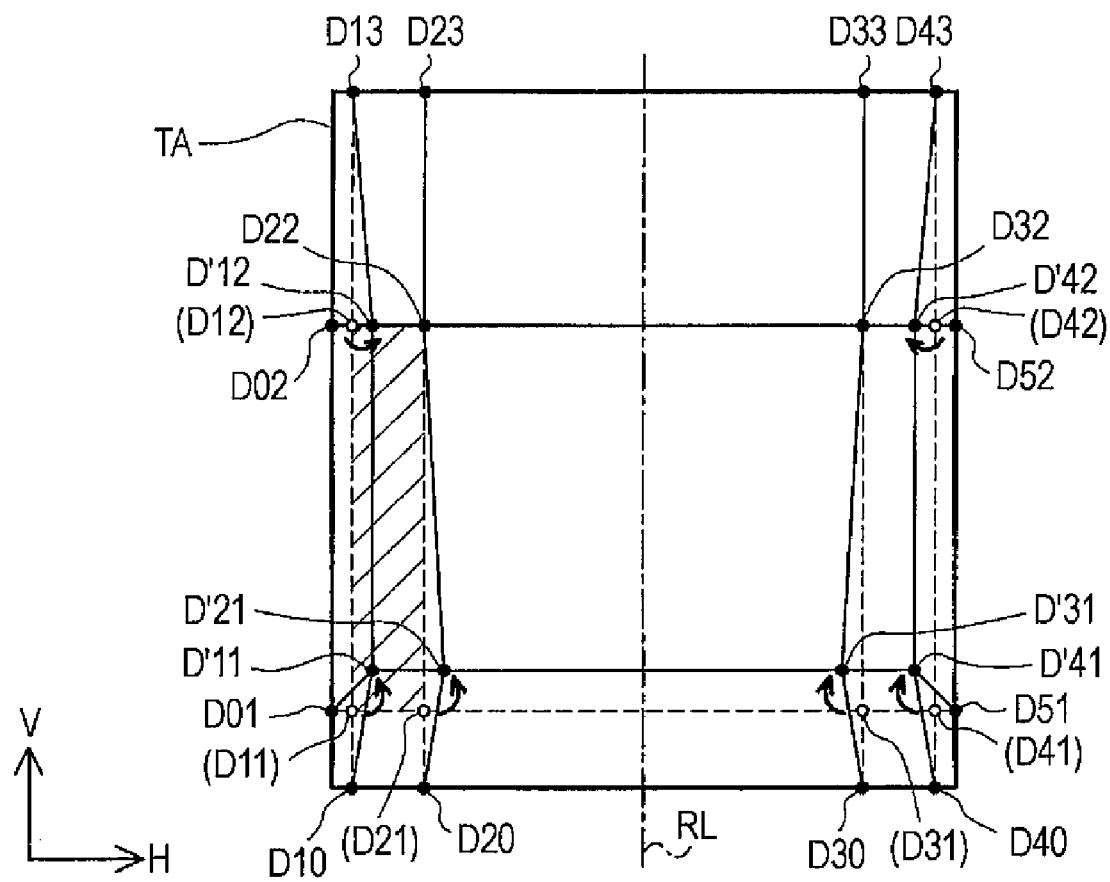
FIG. 34 is a diagram showing an example of movement of positions of division points D according to the division point moving table of FIG. 33.
Figure 36:
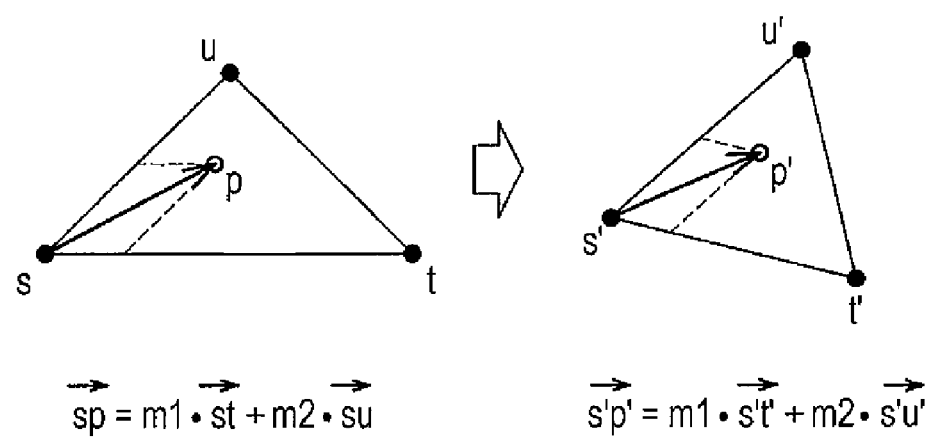
FIG. 36 is a diagram showing a concept of an image transformation processing method for a triangular area according to an embodiment of the invention.

FIG. 33 shows an example of the content of the division point moving table 620. FIG. 34 shows an example of movement of positions of the division points D according to the division point moving table 620. In FIG. 36, among the movement patterns of positions of the division points D defined by the division point moving table 620, a movement pattern corresponding to the combination of the transformation type for sharpening the face and the degree of transformation of "automatic" is shown. As shown in FIG. 33, in the division point moving table 620, movement amounts in a direction H perpendicular to the reference line RL and a direction V parallel to the reference line RL are represented for each division point D. The unit of the movement amounts represented in the division point moving table 620 is a pixel pitch PP of the target image TI. The movement amounts DQp in the table are determined by the transformation amount setting section 490 (FIG. 6).

In step S350 shown in FIG. 8, the transformation amount setting section 490 calculates the movement amounts by converting the set transformation amounts DQp in terms of pixel pitches. For direction H, a movement amount to the observer's right side is represented as a positive value, and a movement amount to the observer's left side is represented as a negative value. For direction V, a movement amount to the upper side is represented as a positive value, and a movement amount to the lower side is represented as a negative value. For example, the division point D11 is moved to the right side along direction H by a distance of DQp times the pixel pitch PP, and is moved to the upper side along direction V by a distance of (2*DQp) times the pixel pitch. Further, the division point D22 has the movement amounts of zero for direction H and direction V, and thus the division point D22 is not moved. When any one of "strong (S)", "medium (M)", and "weak (W)" is selected, a value determined in advance in accordance with each degree of transformation is used as the movement amount DQp, instead of the value adjusted by the transformation amount setting section 490.

In this embodiment, the positions of the division points D (for example, the division point D10 of FIG. 32 and the like) located on the outer line of the transformation area TA are not moved so as not to form an unnatural boundary between the inner and outer images of the transformation area TA. Thus, in the division point moving table 620 of FIG. 33, the movement patterns for the division points D located on the outer line of the transformation area TA are not defined.

In FIG. 34, a division point D before movement is denoted by an outlined circle, and a division point D after movement or without movement is denoted by a black circle. A division point D is referred to as a division point D' after it is moved. For example, the position of the division point D11 is moved in the upper right direction in FIG. 34 and becomes the division point D'11.

In this embodiment, the movement pattern is determined such that all combinations of the division points D having a position relationship symmetrical to the reference line RL (for example, a combination of two division points D11 and D41) maintains the position relationship symmetrical to the reference line RL after movement of the division points D.

The division area transforming section 460 performs an image transformation process for each sub area constituting the transformation area TA such that an image of the sub area in a state before movement of the position of the division point D becomes an image of a sub area newly defined in accordance with movement of the position of the division point D. For example, in FIG. 34, an image of a sub area (a small area denoted by hatching) having vertexes of division points D11, D21, D22 and D12 is transformed into an image of a sub area having vertexes of division points D'11, D'21, D22 and D'12.

Figure 35:
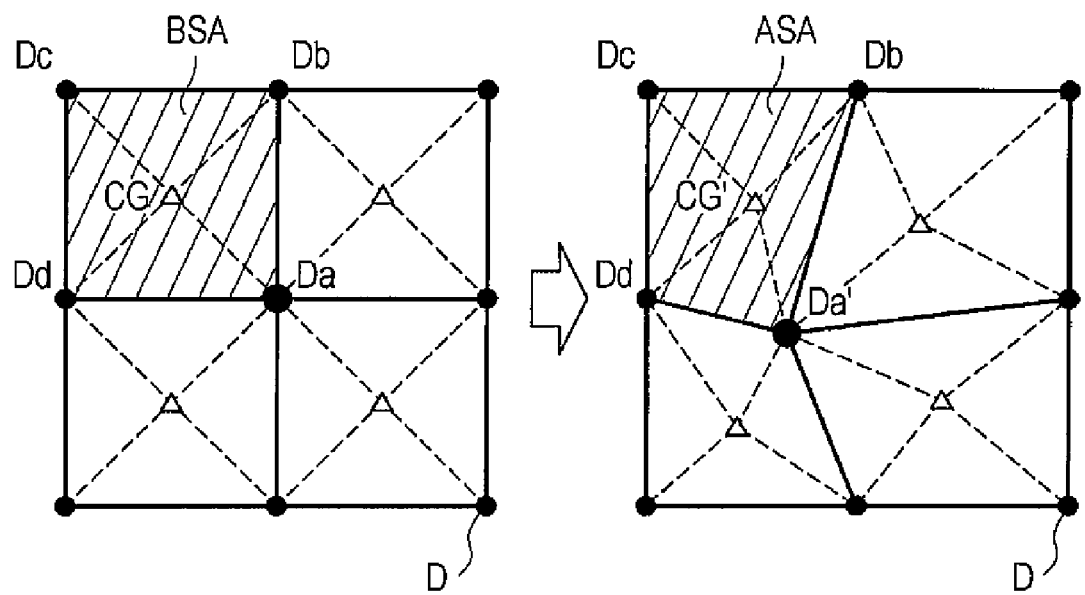
FIG. 35 is a diagram representing a concept of an image transformation processing method by using a division area transformation section according to an embodiment of the invention.

FIG. 35 is a diagram representing a concept of an image transformation processing method by using the division area transformation section 460. In FIG. 35, a division point D is denoted by a black circle. In FIG. 35, for the simplification of description, a state of the division points D before movement of the positions for four sub areas is shown on the left side, and a state of the division points D after movement of the positions for the four sub areas is shown on the right side. The division point Da located in the center is moved to the position of the division point Da', and positions of other division points D are not moved. Accordingly, an image of a rectangular sub area (an observed sub area BSA before transformation) having vertexes of the division points Da, Db, Dc and Dd before movement of the division points D is transformed into an image of a rectangular sub area (an observed sub area ASA after transformation) having vertexes of the division points Da', Db, Dc and Dd.

In this embodiment, a rectangular sub area is divided into four triangular areas by using the center CG of the sub area, and a transformation process of an image is performed for each triangular area. In the example shown in FIG. 35, the observed sub area BSA before transformation is divided into four triangular areas having the center CG of the observed sub area BSA before transformation as one vertex thereof. Similarly, the observed sub area ASA after transformation is divided into four triangular areas having the center CG' of the observed sub area ASA after transformation as one vertex thereof. Then, for each triangular area corresponding to each state before and after movement of the division point Da, the image transformation process is performed. For example, an image of a triangular area having division points Da and Dd and the center CG of the observed sub area BSA before transformation as its vertexes is transformed into an image of a triangular area having division points Da' and Dd and the center CG' of the observed sub area ASA after transformation as its vertexes.

FIG. 36 is a diagram showing a concept of the image transformation processing method for the triangular area. In FIG. 36, an image of an triangular area stu having points s, t and u as its vertexes is transformed into an image of a triangular area s't'u' having points s', t' and u' as its vertexes. The transformation for an image is performed by calculating a position of the triangular area stu before transformation corresponding to each position of a pixel of the triangular area s't'u' after transformation and setting a pixel value of the image before transformation in the calculated position as the pixel value of the image after transformation.

For example, in FIG. 36, it is assumed that the position of the observed pixel p' in the triangular area s't'u' after transformation corresponds to the position p in the image of the triangular area stu before transformation. Calculation of the position p is performed as follows. First, coefficients m1 and m2 used for representing the position of the observed pixel p' as a sum of a vector s't' and a vector s'u' as in the following Numeric Equation 4 are calculated.

$$\overrightarrow{s'p'} = m1 \cdot \overrightarrow{s't'} + m2 \cdot \overrightarrow{s'u'} \qquad \text{Numeric Equation 4}$$

Next, the position p is acquired by calculating a sum of the vector st and the vector su in the triangular area stu before transformation by using the following Numeric Equation 5 in which the calculated coefficients m1 and m2 used.

$$\overrightarrow{sp} = m1 \cdot \overrightarrow{st} + m2 \cdot \overrightarrow{su} \qquad \text{Numeric Equation 5}$$

When the position p of the triangular area stu before transformation coincides with the center position of a pixel of the image before transformation, the pixel value of the pixel becomes the pixel value of the image after transformation. On the other hand, when the position p of the transformation area stu before transformation is deviated from the center position of the pixel of the image before transformation, the pixel value at the position p is calculated by an interpolation method such as a bicubic method by using pixel values of pixels in the vicinity of the position p, and the calculated pixel value becomes the pixel value of the image after transformation.

By calculating the pixel value for each pixel of the image of the triangular area s't'u' after transformation as described above, the image transformation process from the image of the triangular area stu to the image of the triangular area s't'u' can be performed. The division area transforming section 460, for each sub area constituting the transformation area TA shown in FIG. 34, performs the transformation process by defining triangular areas as described above and performs the image transformation process for the transformation area TA.

Figure 37:
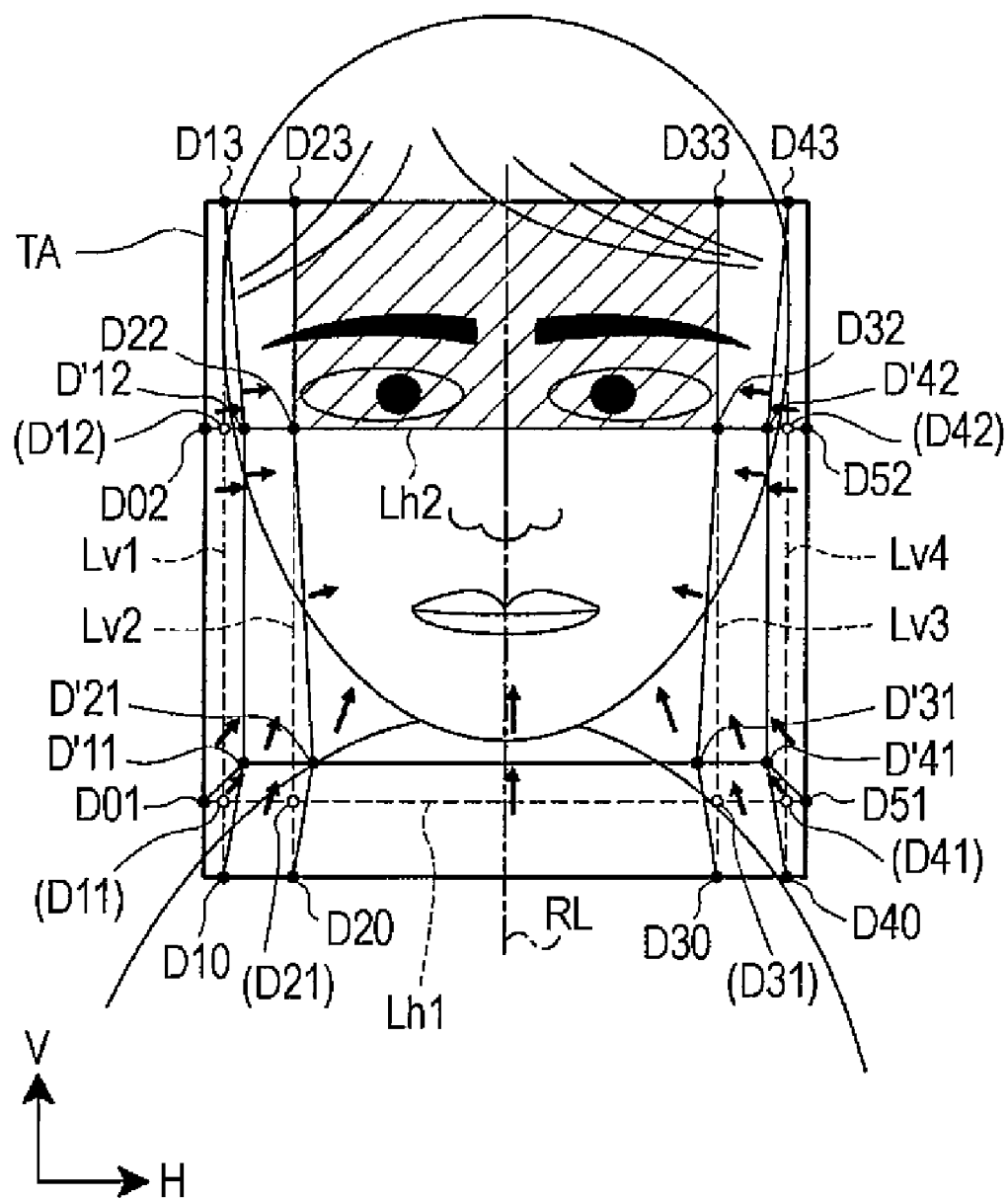
FIG. 37 is a diagram showing the pattern of face shape correction for the above-described case.

The pattern of face shape correction is now described in detail for a case where transformation type A (FIG. 9) for sharpening the face is set as the transformation type and "automatic" is set as the degree of transformation, as an example. FIG. 37 shows the pattern of the face shape correction for such a case. In FIG. 37, images of transformation patterns for sub areas constituting the transformation area TA are denoted by arrows.

In the face shape correction shown in the example of FIG. 37, in relation to a direction V parallel to the reference line RL, the positions of the division points D (D11, D21, D31, and D41) disposed on the horizontal division line Lh1 are moved upward, and the positions of the division points D (D12, D22, D32, and D42) disposed on the horizontal division line Lh2 are not moved (see FIG. 33). Accordingly, an image positioned between the horizontal division line Lh1 and the horizontal division line Lh2 is shrunken for direction V. As described above, since the horizontal division line Lh1 is disposed below the image of the chin and the horizontal division line Lh2 is disposed right below the image of the eye, an image of a part from the chin to a position below the eye is shrunken in direction V in this face shape correction. As a result, the line of the chin of the image is moved upward.

On the other hand, in relation to a direction H perpendicular to the reference line RL, the positions of the division points D (D11 and D12) disposed on the vertical division line Lv1 are moved to the right side, and the positions of the division points D (D41 and D42) disposed on the vertical division line Lv4 are moved to the left side (FIG. 33). Between two division points D disposed on the vertical division line Lv2, the position of the division point D (D21) disposed on the horizontal division line Lh1 is moved to the right side. Between two division points D disposed on the vertical division line Lv3, the position of the division point D (D31) disposed on the horizontal division line Lh1 is moved to the left side (FIG. 33). Accordingly, an image located on the left side of the vertical division line Lv1 is enlarged to the right side in direction H, and an image located on the right side of the vertical division line Lv4 is enlarged to the left side. An image located between the vertical division line Lv1 and the vertical division line Lv2 is shrunken in direction H or is moved to the right side, and an image located between the vertical division line Lv3 and the vertical division line Lv4 is shrunken for direction H or is moved to the left side. An image located between the vertical division line Lv2 and the vertical division line Lv3 is shrunken in direction H with the position of the horizontal division line Lh1 used as the center.

As described above, the vertical division lines Lv1 and Lv4 are disposed on the outer side of the images of the cheek lines, and the vertical lines Lv2 and Lv3 are disposed on the outer side of the images of the tails of the eyes. Thus, in the example of FIG. 37, images of parts of the face image that are located on the outer side of the two tails of the eyes are shrunken in direction H on the whole. In particular, a shrinking ratio near the chin is high. As a result, the shape of the face included in the image becomes thin on the whole in the width direction.

When the above-described transformation patterns in directions H and V are integrated, the shape of the face included in the target image TI is sharpened by the face shape correction example of FIG. 37. The sharpening of the shape of the face may be represented to form a small face.

The sub area (hatched area) having the division points D22, D32, D33 and D23 of FIG. 37 as its vertexes becomes an area including the images of two eyes according to the above-described method of disposing the horizontal division line Lh2 and the vertical division lines Lv2 and Lv3. As shown in FIG. 33, since the division points D22 and D32 are not moved in any of direction H and direction V, the sub area including the images of the two eyes is not transformed. As described above, in the example of FIG. 37, the sub area including the images of the two eyes is not transformed, and accordingly, the image after the face shape correction becomes natural and desirable.

Instead of transforming a transformation area of a part of the target image TI, the aspect ratio of the entire target image TI may be changed. In such a case, other than the transformation process for compressing the target image TI along the direction of the width of the subject, a transformation process for enlarging the target image TI along the direction of the height of the subject may be performed. In such a case, since the ratio of the width of the subject to the height decreases, an impression of the subject acquired from observing the image can be formed to be close to that acquired from observing the real subject.

B. Second Embodiment

In the first embodiment, the distance from the photographic device to the subject is used as the subject distance Sd, and the degree of the image process is changed in accordance with the subject distance Sd. However, a relative distance between targets for photographing operation that are included in the target image TI may be used, and the degree of the image process may be changed for each area of the target image TI in such a case. Here, the targets for the image pickup operation mean objects existing within the target image TI. The relative distance between the targets for the photographing operation represents a distance between the targets for the photographing operation that are included in the target image TI.

The sharpness of an image formed through eyes changes in accordance with a distance from the observed target. In other words, the eyes adjust a focus to increase sharpness of the observed target. Accordingly, as a distance from the observed target increases, the sharpness decreases. Thus, in the DSC 100, a process is performed for the image data such that the sharpness changes in accordance with the distance from a focus area FC with the in-focus area (focus area FC) used as a reference. The configurations of the DSC 100 and the printer 300 according to the second embodiment are the same as those according to the first embodiment.

Figure 38A:
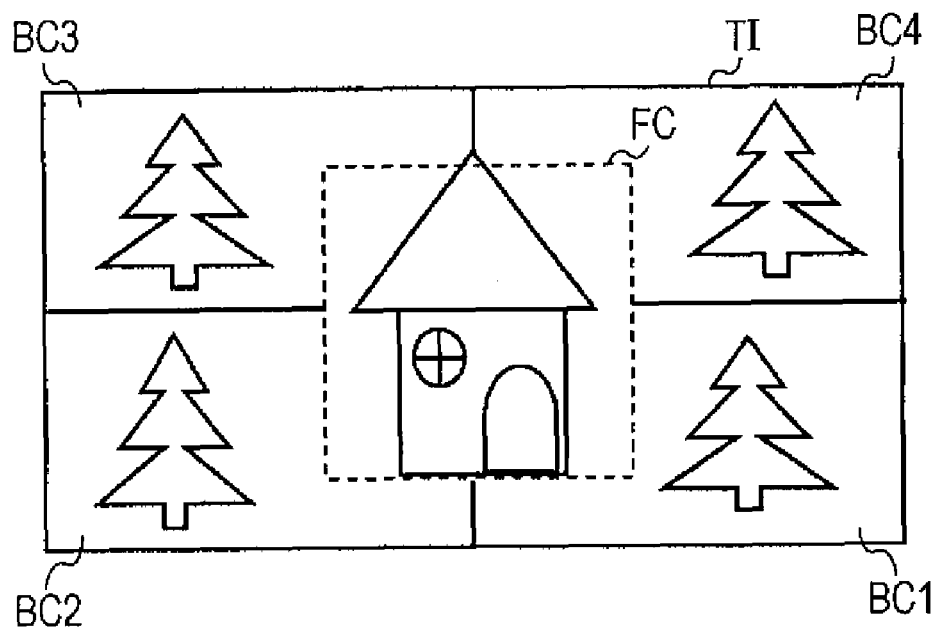
FIGS. 38A and 38B show a position relationship between a focus area FC of a target image TI and a background area BC according to an embodiment of the invention.
Figure 38B:
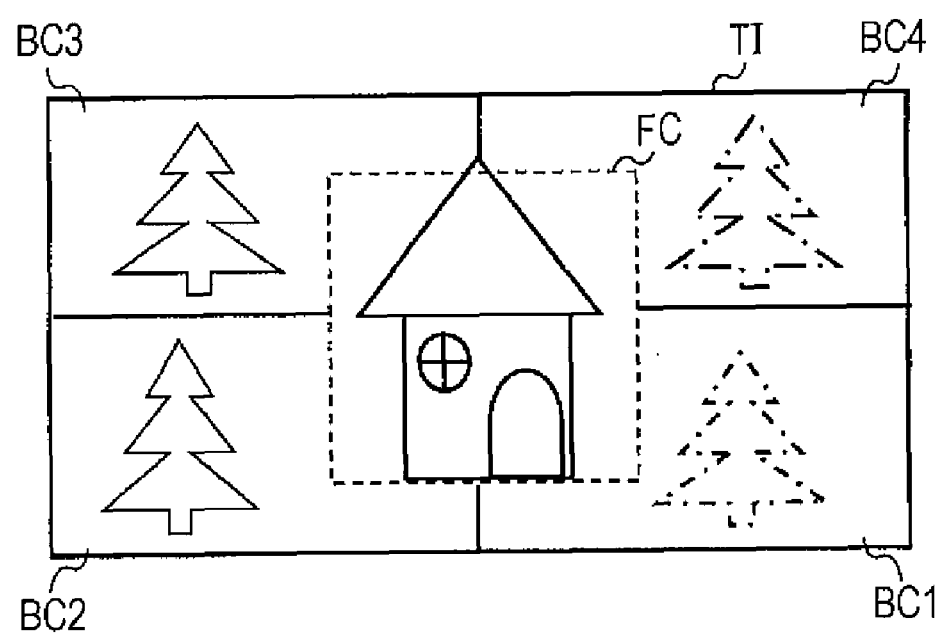
Figure 39:
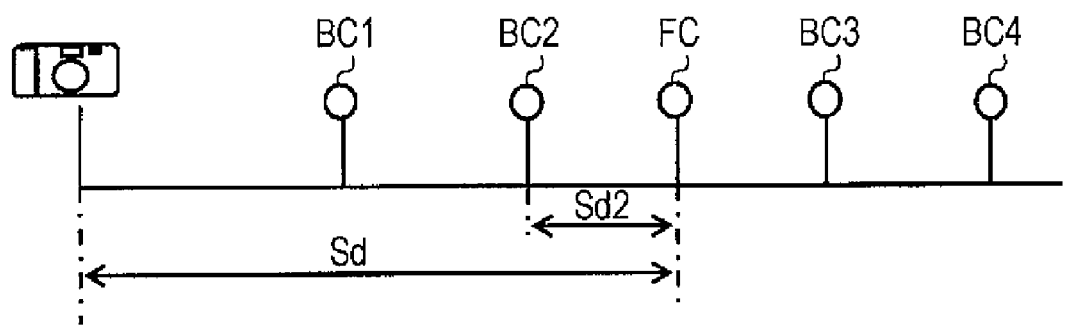
FIG. 39 is a diagram showing a distance relationship between the focus area FC and the background area BC according to an embodiment of the invention.
Figure 40:
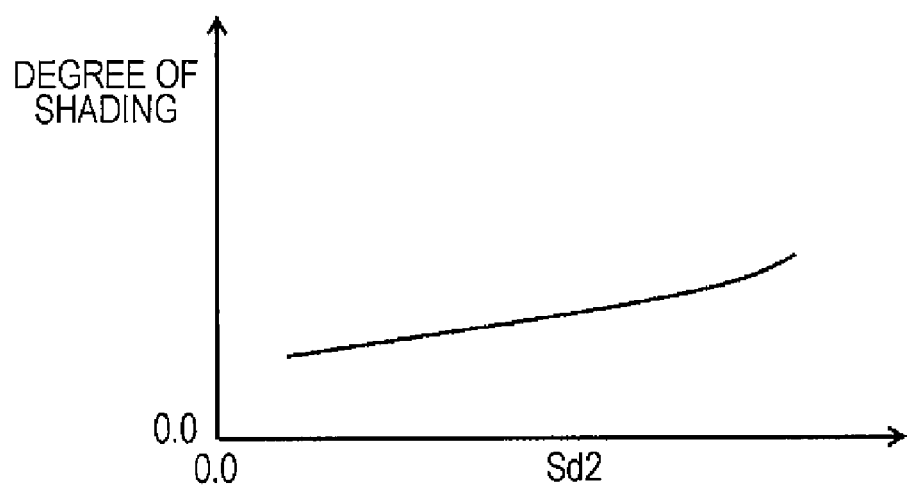
FIG. 40 is a diagram showing a relationship between a relative distance Sd2 and the degree of shading according to an embodiment of the invention.

FIGS. 38A and 38B show a position relationship between the focus area FC of the target image TI and a background area BC. FIG. 39 shows a distance relationship between the focus area FC and the background area BC. As shown in the figures, objects included in background areas BC1 and BC2 are located on the side of the photographing position from the focus area FC. Objects included in background areas BC3 and BC4 are located on the rear side of the focus area FC. FIG. 40 shows a relationship between a relative distance Sd2 and the degree of shading. The degree of shading shown in FIG. 40 is increased as the relative distance Sd2 increases.

Figure 41:
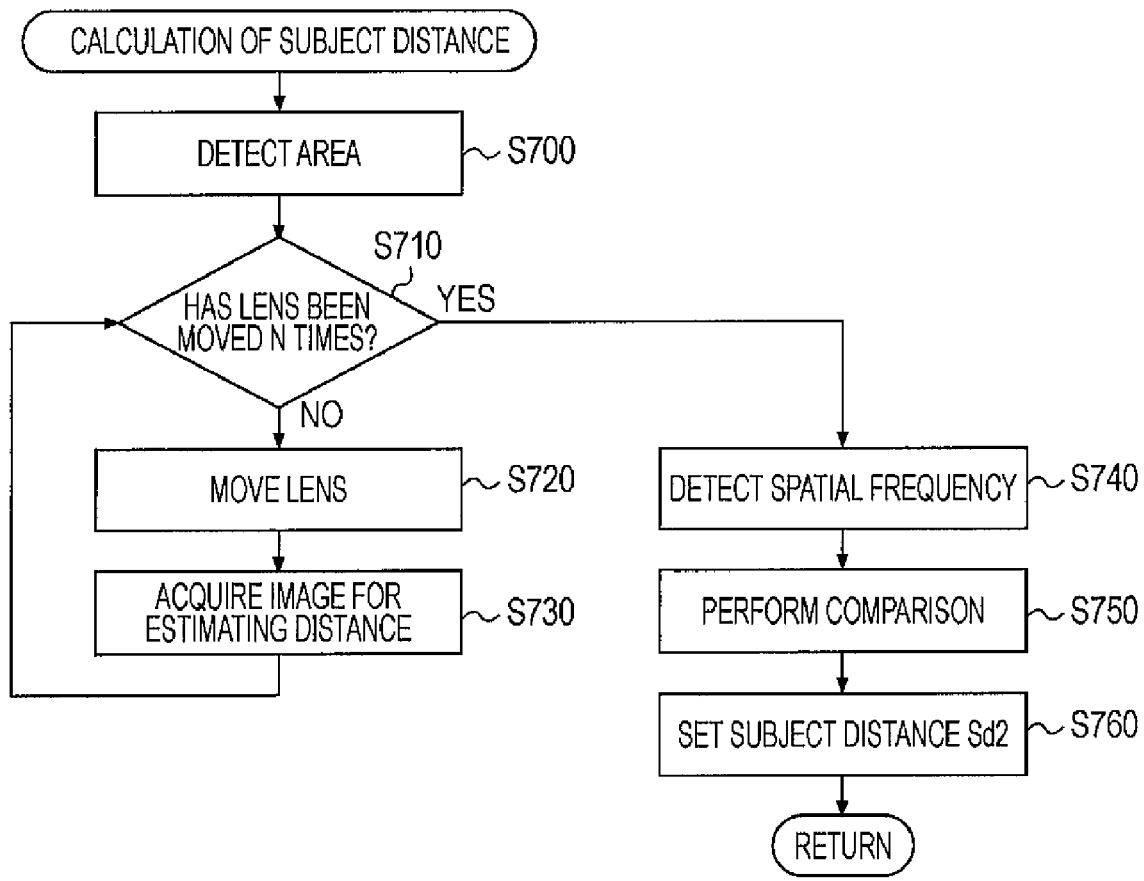
FIG. 41 is a flowchart of distance calculation using a DSC according to a second embodiment of the invention.

FIG. 41 is a flowchart of distance calculation using the DSC 100 according to the second embodiment. This process is performed in step S130 of FIG. 2. In step S700, the subject distance estimating section 230 acquires the focus area FC by performing an auto focus operation for an area to be focused. In step S710, since a lens 102 has not been moved, the subject distance estimating section 230 moves the lens 102 to a predetermined position to change the focus by controlling the lens driving control unit 106 (step S720).

An image for distance estimation is then acquired in a state that the lens 102 is moved to the predetermined position (step S730). Through a series of steps S710-S730, the information acquiring part 240 acquires a plurality of images for distance estimation that have different focuses.

Figure 42:
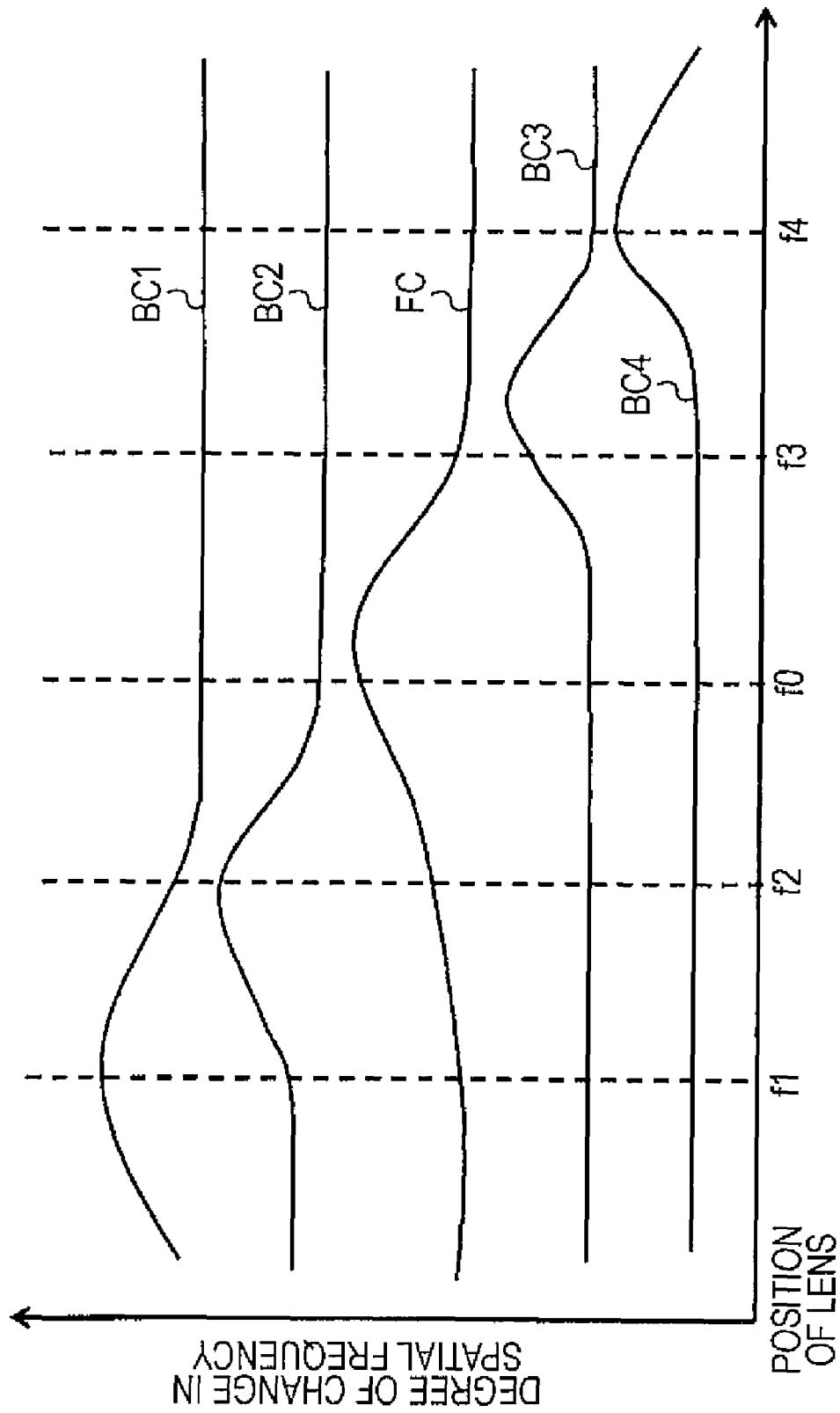
FIG. 42 is a diagram showing changes of spatial frequencies of the focus area FC and the background areas BC according to changes of the position of the lens, according to an embodiment of the invention.

FIG. 42 shows changes of spatial frequencies of the focus area FC and the background areas BC according to changes of the position of the lens. In FIG. 42, the horizontal axis represents the position of the lens 102 after movement, and the vertical axis represents the spatial frequency value for each area. The subject distance estimating section 230 detects spatial frequencies of areas for each lens position from the acquired plurality of images for distance estimation (step S740). At that moment, the subject distance estimating section 230 detects the spatial frequencies of each area shown in FIG. 38.

The subject distance estimating section 230 compares values of the detected spatial frequencies for each area and calculates relative position relationships (step S750). As shown in FIG. 42, the spatial frequency of each area changes in accordance with a change of the position of the lens 102. The lens position for which the spatial frequency is high can be regarded to be in focus for the area. Accordingly, it can be determined whether the lens 102 is in focus for the areas based on changes of the values of the spatial frequencies. In particular, a table that associates the value of the spatial frequency for each area with the position of the lens 102 is stored, and a relative position relationship of the areas can be calculated by referring to the table. In step S710, when the number of times of movement of the lens 102 is increased, the number of samples of the spatial frequencies increases, and accordingly, relative position relationships can be detected more precisely.

For example, in the area BC1, as the position of the lens is moved forward from a short-distance position, the spatial frequency increases and has its peak near a position f1. Thereafter, as the lens 102 is moved forward, the spatial frequency decreases. Accordingly, when the above-described change is compared with the change (peak at f0) of the value of the spatial frequency for the focus area FC, it can be determined that the area BC is an object existing on the front side of the focus area FC. In addition, f0 is the position of the lens 102 in a case where an image forming the focus area FC is focused. By comparing the above-described change of the spatial frequency with that of the focus area and those of other background areas, it is possible to calculate a relative position relationship of each area with respect to the focus area.

The information acquiring part 240 stores the calculated relative position relationships for each area in association with the area as supplementary information. In such a case, the relative distance Sd2 is stored as the stored supplementary information in association with each pixel constituting the area. When the image data has a channel other than channels of RGB color data, the supplementary information may be stored in the channel.

The stored distance information Sd2 is read out by the printer 300 side, and is used for calculating the degree of shading by the shading processing unit 540. In other words, the shading processing unit 540, in step S280 shown in FIG. 8, performs a shading process by setting the degree of shading for each area based on the degree of shading shown in FIG. 40. Thus, in the image data after correction, a process for increasing the contrast is performed for the focus area FC, and a shading process is performed for other areas with the degree of the shading process changed in accordance with the relative distance Sd2. Accordingly, as shown in FIG. 38, a clear image is acquired in the focus area FC. In addition, the degree of the shading process is decreased for the background areas BC2 and BC3, and the degree of the shading process is increased for the background areas BC1 and BC4. Accordingly, the degree of shading is changed in accordance with the relative distance from the focus area FC, and thereby the image data after correction is formed to be close to an image formed through the eyes.

What is claimed is:

1. An image processing apparatus comprising:
   a face detecting unit that detects a face included in image data generated by a photographing operation;
   a face transforming and correcting unit that performs a face correcting process for shrinking a width of a detected face in a case where the face is detected by the face detecting unit; and
   a shading processing unit that performs a process for increasing sharpness of an in-focus area of the image data and performs a shading process for an out-of-focus area of the image data, in a case where a face has not been detected by the face detecting unit.

2. The image processing apparatus according to claim 1, further comprising a position relationship estimating unit that estimates a position relationship between photographing targets included in the image data,
   wherein the shading processing unit changes a degree of the shading process in accordance with the estimated position relationship.

3. The image processing apparatus according to claim 2, wherein the position relationship estimating unit acquires a plurality of types of image data with different focal distances in photographing a subject and estimates a relative position relationship between the photographing targets included in the subject based on degrees of sharpness between the acquired plurality of types of image data.

4. The image processing apparatus according to claim 1,
   wherein the image processing apparatus can perform a plurality of types of image processes for the image data, and
   wherein the image processing apparatus accepts a request for performing the plurality of types of image processes and performs the received image process.

5. An image processing method for performing a predetermined image process for image data acquired from photographing a subject, the image processing method comprising:
   detecting a face in the image data;
   performing a face correcting process for shrinking a width of a detected face in a case where the face is detected; and
   performing a process for increasing sharpness of an in-focus area of the image data and performing a shading process for an out-of-focus area of the image data, in a case where a face has not been detected.

6. An image processing system comprising:
   an image data acquiring device that acquires image data by photographing a subject and
   an output device that performs an image process for the acquired image data and outputs the image data,
   wherein the image data acquiring device includes a face detecting unit that detects a face in the image data, and
   wherein the output device includes:
   a face correcting unit that performs a face correcting process for shrinking a width of a detected face in a case where the face is detected by the face detecting unit; and
   a shading processing unit that performs a process for increasing sharpness of an in-focus area of the image data and performs a shading process for an out-of-focus area of the image data, in a case where a face has not been detected by the face detecting unit.

* * * * *